(12) United States Patent
Hagiwara et al.

(10) Patent No.: US 12,516,470 B2
(45) Date of Patent: Jan. 6, 2026

(54) ARTIFICIAL LEATHER AND PRODUCTION METHOD THEREFOR, AND COMPOSITE ARTIFICIAL LEATHER

(71) Applicant: Toray Industries, Inc., Tokyo (JP)

(72) Inventors: Tatsuya Hagiwara, Gifu (JP); Masaru Ueno, Gifu (JP); Satoshi Yanagisawa, Gifu (JP); Yukihiro Matsuzaki, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 18/845,126

(22) PCT Filed: Mar. 7, 2023

(86) PCT No.: PCT/JP2023/008489
§ 371 (c)(1),
(2) Date: Sep. 9, 2024

(87) PCT Pub. No.: WO2023/189269
PCT Pub. Date: Oct. 5, 2023

(65) Prior Publication Data
US 2025/0223756 A1    Jul. 10, 2025

(30) Foreign Application Priority Data

Mar. 28, 2022  (JP) ................................ 2022-051294
Jun. 29, 2022  (JP) ................................ 2022-104225

(51) Int. Cl.
D06N 3/00   (2006.01)
D06N 3/14   (2006.01)

(52) U.S. Cl.
CPC ......... D06N 3/0036 (2013.01); D06N 3/0004 (2013.01); D06N 3/0011 (2013.01);
(Continued)

(58) Field of Classification Search
CPC ............................ D06N 3/007; D06N 3/0004
See application file for complete search history.

(56) References Cited

U.S. PATENT DOCUMENTS

2009/0291250 A1* 11/2009 Okada .................. D06N 3/0013
                                                              28/107
2011/0045231 A1*  2/2011 Kajiwara ............. D06N 3/0013
                                                              28/107
(Continued)

FOREIGN PATENT DOCUMENTS

JP      H1046478 A        2/1998
JP    2003213576 A   *   7/2003
(Continued)

OTHER PUBLICATIONS

International Search Report (PCT/ISA/210) with English translation and Written Opinion (PCT/ISA/237) mailed on May 30, 2023, by the Japanese Patent Office as the International Searching Authority for International Application No. PCT/JP2023/008489, 15 pages.

(Continued)

*Primary Examiner* — Cachet I Proctor
(74) *Attorney, Agent, or Firm* — Buchanan Ingersoll & Rooney PC

(57) ABSTRACT

To provide an artificial leather which simultaneously achieves uniform and elegant surface quality, good touch sensation, and wear resistance while suppressing the total amount of heat generated at the time of combustion. Provided is an artificial leather including: a fiber-tangled body containing a nonwoven fabric made of fine fibers having an average single fiber diameter of 0.01 μm or more and 10.0 μm or less; and a polymer elastic body. The artificial leather satisfies the following requirements:
requirement 1: the artificial leather has a weight per unit area of 25 g/m² or more and 75 g/m² or less; and
(Continued)

requirement 2: the number per unit area of micropores penetrating the artificial leather in the thickness direction and having a pore diameter of 35 μm or more and 500 μm or less is $0.1/mm^2$ or more and $5.0/mm^2$ or less.

9 Claims, 2 Drawing Sheets

(52) U.S. Cl.
CPC ............... *D06N 3/007* (2013.01); *D06N 3/14* (2013.01); *D10B 2331/04* (2013.01); *D10B 2331/10* (2013.01)

(56) References Cited

U.S. PATENT DOCUMENTS

| | | | |
|---|---|---|---|
| 2016/0215444 A1* | 7/2016 | Ashida | D06N 3/0075 |
| 2017/0058091 A1* | 3/2017 | Park | D06N 3/0052 |

FOREIGN PATENT DOCUMENTS

| | | | |
|---|---|---|---|
| JP | 2004084076 A | | 3/2004 |
| JP | 2004211262 A | | 7/2004 |
| JP | 2010248644 A | * | 11/2010 |
| JP | 2011117104 A | | 6/2011 |
| JP | 2011122423 A | | 6/2011 |
| JP | 2018003181 A | | 1/2018 |
| JP | 2020051003 A | | 4/2020 |
| WO | 2008013206 A1 | | 1/2008 |
| WO | 2009041093 A1 | | 4/2009 |

OTHER PUBLICATIONS

Extended European Search Report issued Nov. 3, 2025, by the European Patent Office in corresponding European Patent Application No. 23779296.5—1102. (9 pages).

* cited by examiner

[FIG.1]
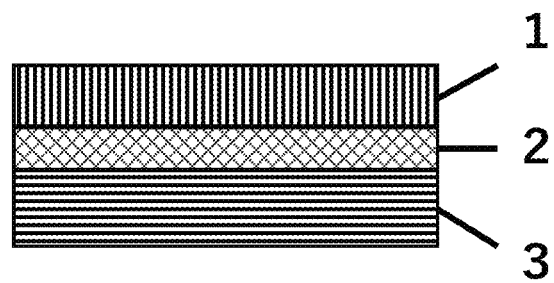
[FIG.2]
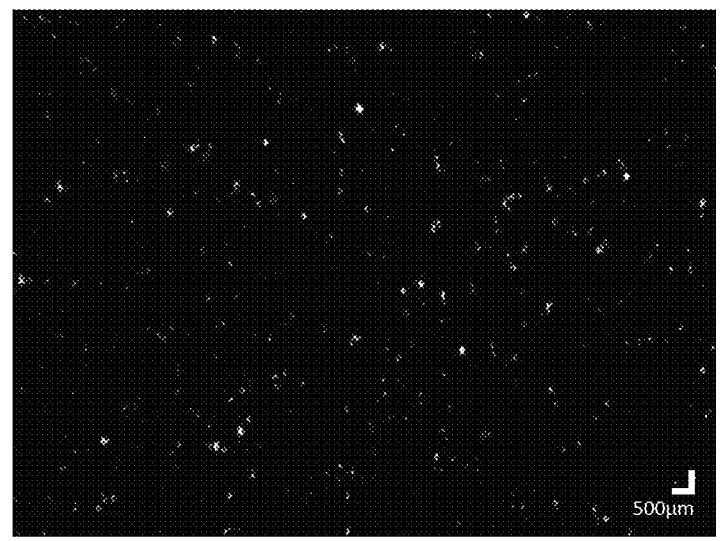

[FIG.3]
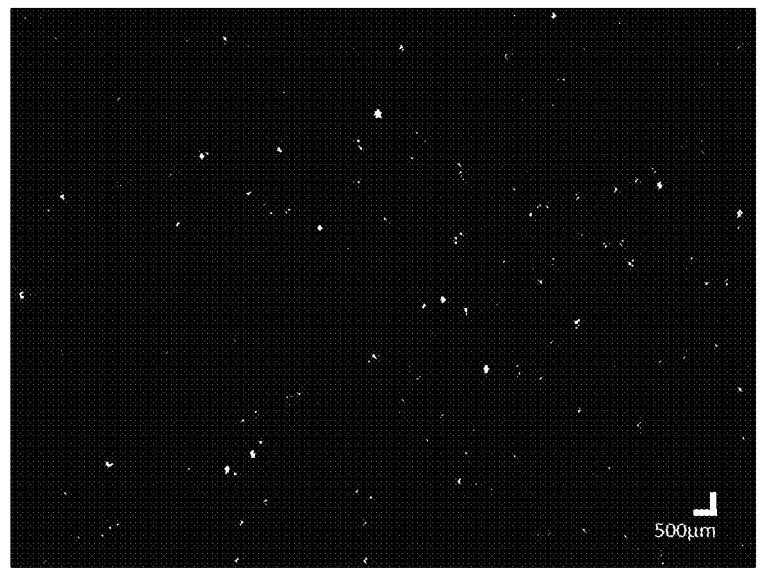
[FIG.4]
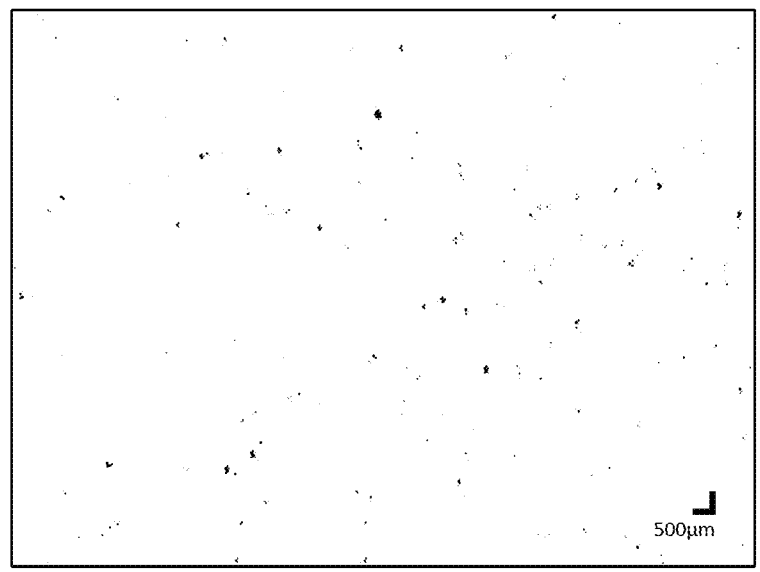

ARTIFICIAL LEATHER AND PRODUCTION METHOD THEREFOR, AND COMPOSITE ARTIFICIAL LEATHER

CROSS REFERENCE TO RELATED APPLICATIONS

This application is the U.S. National Phase of PCT/JP2023/008489, filed Mar. 7, 2023 which claims priority to Japanese Patent Application No. 2022-051294, flied Mar. 28, 2022, and Japanese Patent Application No. 2022-104225, filed Jun. 29, 2022, the disclosure of each of these applications being incorporated herein by reference in its entirety for all purposes.

FIELD OF THE INVENTION

The present invention relates to an artificial leather including: a fiber-tangled body containing a nonwoven fabric made of fine fibers as a constituent element; and a polymer elastic body, and particularly relates to an artificial leather suitable for a material for wallpaper and a composite artificial leather.

BACKGROUND OF THE INVENTION

Artificial leather like Natural leather including a fiber-tangled body containing a nonwoven fabric mainly composed of fine fibers as a constituent element, and a polymer elastic body has excellent characteristics such as high durability and uniformity of quality as compared to natural leather. Artificial leather is used not only as clothing materials but also in various fields such as vehicle interior materials, interiors, shoes, and materials for wall paper.

Hitherto, a method of using a nonwoven fabric formed by wet papermaking or a long fiber nonwoven fabric has been proposed as a means for achieving uniform at a low weight per unit area and elegant surface quality, good touch sensation, and wear resistance in an artificial leather using a nonwoven fabric made of fine fibers and a polymer elastic body (Patent Documents 1 to 3).

PATENT DOCUMENTS

Patent Document 1: International Publication No. 2008/013206
Patent Document 2: International Publication No. 2009/041093
Patent document 3: Japanese Patent Laid-open Publication No. 2004-84076

SUMMARY OF THE INVENTION

When artificial leather is used as a material for wallpaper, it is required to have not only characteristics such as good touch sensation and uniform and elegant surface quality but also wear resistance and fire resistance that can withstand practical use. In general, the total amount of heat generated at the time of combustion is suppressed by reducing the weight per unit area of the artificial leather, whereby an artificial leather having a certain fire resistance can be obtained. However, as the weight per unit area of the artificial leather is reduced, variation in the weight per unit area of the artificial leather tend to increase. Therefore, portions with an extremely low weight per unit area are locally generated, and large pores penetrating the artificial leather in the thickness direction are generated, resulting in non-uniform surface quality and failure in maintaining uniform and elegant surface quality. Naturally, such an artificial leather cannot achieve wear resistance that can withstand practical use as a material for wallpaper.

In Patent Documents 1 and 2, two layers of synthetic fiber nonwoven fabrics formed by wet papermaking are layered, and fibers constituting the two layers are interlaced with each other to be integrated, and impregnated with a polymer elastic body, so that the weight per unit area thereof is large. That is, although an artificial leather having texture similar to that of natural leather and uniform surface quality can be obtained using the nonwoven fabric formed by wet papermaking, such a nonwoven fabric has a large weight per unit area, and thus the fire resistance defined by the Building Standards Act in the material for wallpaper cannot be obtained. The present inventors have found that the weight per unit area for which an artificial leather used as a material for wallpaper achieves fire resistance is as low as 75 g/m$^2$ or less, but the weight per unit areas of the artificial leathers in Patent Documents 1 and 2 exceed 75 g/m$^2$, and thus the fire resistance cannot be achieved.

Patent Document 3 discloses an artificial leather for clothing in which a polymer elastic body is impregnated into a long fiber nonwoven fabric. With such a configuration, it is possible to obtain an artificial leather which is soft to some extent while having dense and uniform surface quality. However, even in such a technique, it is difficult to maintain uniform and elegant surface quality in an artificial leather having a weight per unit area of 75 g/m$^2$ or less. Moreover, since fibers oriented in the thickness direction of the artificial leather are reduced, the touch sensation of the artificial leather when napped is not sufficient.

Therefore, the present invention has been made in view of the above circumstances, and an object of the present invention is to provide an artificial leather and a composite artificial leather that achieve uniform and elegant surface quality, good touch sensation, and wear resistance while suppressing the total amount of heat generated at the time of combustion and having good fire resistance.

As a result of repeated studies by the present inventors to achieve the above object, an artificial leather that achieves good touch sensation and wear resistance as well as uniform and elegant surface quality while suppressing the total amount of heat generated at the time of combustion can be obtained by widening, before dyeing an artificial leather having a predetermined weight per unit area, the artificial leather so as to have a predetermined width with respect to the width of the artificial leather, then dyeing the artificial leather, and further widening the dyed artificial leather so as to have a predetermined width with respect to the width of the artificial leather after dyeing. Furthermore, a composite artificial leather including this artificial leather and a base layer provided on one surface of the artificial leather with an adhesive layer interposed therebetween can also be a composite artificial leather that achieves good touch sensation and wear resistance as well as uniform and elegant surface quality while suppressing the total amount of heat generated at the time of combustion. The present invention has been completed based on these findings, and the present invention provides an artificial leather having the following configuration.

[1] An artificial leather including: a fiber-tangled body containing a nonwoven fabric made of fine fibers having an average single fiber diameter of 0.01 μm or more and 10.0 μm or less; and a polymer elastic body, wherein the artificial leather satisfies the following requirements:

requirement 1: the artificial leather has a weight per unit area of 25 g/m² or more and 75 g/m² or less; and requirement 2: a number per unit area of micropores penetrating the artificial leather in the thickness direction and having a pore diameter of 35 μm or more and 500 μm or less is 0.1/mm² or more and 5.0/mm² or less.

[2] The artificial leather according to [1], wherein micropores penetrating the artificial leather in the thickness direction have an average pore diameter of 35 μm or more and 100 μm or less.

[3] The artificial leather according to [1] or [2], wherein the artificial leather has a nap length of 200 μm or more and 600 μm or less.

[4] The artificial leather according to any one of [1] to [3], wherein the fine fibers have a fiber length of 25 mm or more and 95 mm or less.

[5] The artificial leather according to any one of [1] to [4], wherein the fine fibers include a polyester-based resin containing a black pigment, and the black pigment has an average particle diameter of 0.05 μm or more and 0.20 μm or less.

[6] A method for producing an artificial leather, including: forming a sheet including a fiber-tangled body containing a nonwoven fabric made of fine fibers having an average single fiber diameter of 0.01 μm or more and 10.0 μm or less as a constituent element, and a polymer elastic body; performing a first widening step of buffing the sheet and widening the sheet by 25% or more and 40% or less with respect to a width of the sheet obtained; and performing a second widening step of dyeing the sheet after the first widening step, and widening the sheet by 3% or more and 10% or less with respect to a width of the sheet obtained.

[7] The method for producing an artificial leather according to [6], wherein in the buffing of the sheet, only one of surfaces of the sheet is buffed.

[8] The method for producing an artificial leather according to [6] or [7], wherein in the first widening step, the sheet after buffing and before widening has a weight per unit area of 80 g/m² or more and 110 g/m² or less.

[9] A composite artificial leather including: the artificial leather according to any one of [1] to [5]; and a base layer provided on one surface of the artificial leather with an adhesive layer interposed between the artificial leather and the base layer, wherein a main component of a resin composition of the adhesive layer is at least one selected from the group consisting of a vinyl acetate-based resin, an ethylene-vinyl acetate copolymer-based resin, a polypropylene-based resin, a polyethylene-based resin, an acrylic resin, and a vinyl chloride-based resin.

According to the present invention, it is possible to obtain an artificial leather that achieves good touch sensation and wear resistance as well as uniform and elegant surface quality while suppressing the total amount of heat generated at the time of combustion. Furthermore, a composite artificial leather including the artificial leather of the present invention and a base layer provided on one surface of the artificial leather with an adhesive layer interposed therebetween can also be a composite artificial leather that achieves good touch sensation and wear resistance as well as uniform and elegant surface quality while suppressing the total amount of heat generated at the time of combustion.

BRIEF DESCRIPTION OF THE DRAWINGS

FIG. 1 is a schematic cross-sectional view illustrating a configuration of the composite artificial leather of the present invention.

FIG. 2 is a microscope image of a surface of the artificial leather of Example 1.

FIG. 3 is an image obtained by binarizing the microscope image.

FIG. 4 is a black-and-white inverted image obtained by binarizing the microscope image.

DETAILED DESCRIPTION OF EMBODIMENTS OF THE INVENTION

The artificial leather of the present invention includes a fiber-tangled body containing a nonwoven fabric made of fine fibers having an average single fiber diameter of 0.01 μm or more and 10.0 μm or less as a constituent element, and a polymer elastic body, and satisfies the following requirements:

requirement 1: the artificial leather has a weight per unit area of 25 g/m² or more and 75 g/m² or less; and requirement 2: the number per unit area of micropores penetrating the artificial leather in the thickness direction and having a pore diameter of 35 μm or more and 500 μm or less is 0.1/mm² or more and 5.0/mm² or less.

The composite artificial leather of the present invention is preferably a composite artificial leather including: the artificial leather; and a base layer provided on one surface of the artificial leather with an adhesive layer interposed between the artificial leather and the base layer, wherein a main component of a resin composition of the adhesive layer is at least one selected from the group consisting of a vinyl acetate-based resin, an ethylene-vinyl acetate copolymer-based resin, a polypropylene-based resin, a polyethylene-based resin, an acrylic resin, and a vinyl chloride-based resin.

The artificial leather of the present invention includes, as constituent elements, a fiber-tangled body containing a nonwoven fabric made of fine fibers as a constituent element, and a polymer elastic body impregnated into a part of the fiber-tangled body. Hereinafter, these constituent elements will be described in detail, but the present invention is not limited to the scope described below at all as long as the gist thereof is not exceeded.

[Fiber-Tangled Body]

The fine fibers constituting the nonwoven fabric and the fiber-tangled body used in the present invention are preferably made of melt-spinnable thermoplastic resins including polyesters such as polyethylene terephthalate, polytrimethylene terephthalate, polytetramethylene terephthalate and polylactic acid, polyamides such as polyamide 6, polyamide 66 and polyamide 12, polyolefins such as acrylic, polyethylene and polypropylene, polyphenylene sulfide (PPS) and thermoplastic cellulose. Among them, a polyester-based resin is preferably used from the viewpoint of strength, dimensional stability, and light resistance.

Examples of the polyester-based resin include polycyclohexylene dimethylene terephthalate, polyethylene-2,6-naphthalenedicarboxylate, and polyethylene-1,2-bis(2-chlorophenoxy) ethane-4,4'-dicarboxylate, in addition to polyethylene terephthalate, polytrimethylene terephthalate, and polytetramethylene terephthalate. Among them, polyethylene terephthalate, which is most commonly used, or a polyester copolymer mainly containing an ethylene terephthalate unit is preferably used.

In addition, as the polyester-based resin, a single polyester may be used or two or more different polyesters may be used, but when two or more different polyesters are used, from the viewpoint of compatibility of the two or more components, a difference in intrinsic viscosity (IV value)

between the polyesters to be used is preferably 0.50 or less, and more preferably 0.30 or less.

In the present invention, the intrinsic viscosity is calculated by the following method.
(1) Dissolve 0.8 g of sample polymer in 10 mL of ortho-chlorophenol.
(2) Calculate a relative viscosity nr by the following formula using an Ostwald viscometer at a temperature of 25° C. and round off to the second decimal place.

$$n_r = \eta/\eta_0 = (t \times d)/(t_0 \times d_0)$$

Intrinsic viscosity ($IV$ value) = $0.0242 \eta_r + 0.2634$ (where π represents the viscosity of a polymer solution, $\eta_0$ represents the viscosity of ortho-chlorophenol, t represents a dropping time (seconds) of the solution, d represents the density (g/cm$^3$) of the solution, $t_0$ represents the dropping time (seconds) of ortho-chlorophenol, and $d_0$ represents the density (g/cm$^3$) of ortho-chlorophenol).

As the cross-sectional shape of the fine fiber, a circular cross section is preferable from the viewpoint of processing operability, but it is also possible to employ cross-sectional shapes of modified cross section such as an ellipse, polygonal shapes such as a flat shape, and a triangular shape, and a fan shape and a cross shape, a hollow shape, a Y shape, a T shape, and a U shape according to desired characteristics.

The average single fiber diameter of the fine fibers is 0.01 μm or more and 10.0 μm or less. When the average single fiber diameter of the fine fibers is 0.01 μm or more, preferably 1.0 μm or more, an excellent effect of color developability after dyeing, light resistance and rubbing fastness, and stability during spinning is exhibited. On the other hand, when the average single fiber diameter of the fine fibers is 10.0 μm or less, preferably 7.0 μm or less, and more preferably 5.0 μm or less, an artificial leather that is dense and excellent in touch sensation is obtained.

In the present invention, the average single fiber diameter of the fine fibers is calculated by photographing an SEM image of a cross section of the artificial leather with a scanning electron microscope (SEM, for example, "VHX-D500/D510" type manufactured by Keyence Corporation), randomly selecting 10 fibers having a circular shape or an elliptical shape close to a circular shape, measuring the single fiber diameters of the fibers, calculating the arithmetic average of the 10 fibers, and rounding the arithmetic average off to the first decimal place. However, when fine fibers having a modified cross section are used, first, the cross-sectional area of the single fiber is measured, and the diameter of a hypothetical circle on the assumption that the cross section was circular is calculated to obtain the diameter of the single fiber.

Black pigments, chromatic fine-particle oxide pigments, inorganic particles such as titanium oxide particles, a lubricant, a heat stabilizer, an ultraviolet absorber, a conductive agent, a heat storage agent, an antimicrobial agent, and the like can be added to the resin that forms the fine fiber in accordance with various purposes as long as the object of the present invention is not hindered.

In the present invention, in order to achieve both deep color and uniform color developability, the fine fibers are preferably made of a resin containing a black pigment, and the black pigment preferably has an average particle diameter of 0.05 μm or more and 0.20 μm or less.

The average particle diameter of the black pigment herein refers to an average particle diameter in a state where the black pigment is present in the fine fibers, and is generally referred to as a secondary particle diameter. When the average particle diameter of the black pigment is 0.05 μm or more, preferably 0.07 μm or more, the black pigment is held inside the fine fibers, so that the pigment is suppressed from falling off from the fine fibers. When the average particle diameter of the black pigment is 0.20 μm or less, preferably 0.18 μm or less, more preferably 0.16 μm or less, the exposure of the pigment on the surface of the fine fibers can be suppressed, and the stability during spinning and the yarn strength are excellent, which is preferable.

The coefficient of variation (CV) of the particle diameter of the black pigment is preferably 75% or less. When the coefficient of variation (CV) of the particle diameter of the black pigment is 75% or less, preferably 65% or less, more preferably 60% or less, still more preferably 55% or less, and most preferably 50% or less, the distribution of the particle diameter becomes small, and thus it is possible to suppress the exposure of the pigment on the surface of the fine fibers, falling off of small particles from the surface, spinning faults due to significantly aggregated particles, a significant decrease in yarn strength, and the like. The lower limit of the coefficient of variation in the particle diameter in the present invention is not particularly limited, but is preferably 0.1% or more from the viewpoint of spinning operability and production cost.

In the present invention, the average particle diameter and the coefficient of variation (CV) of the black pigment are calculated by the following method.
(1) An ultrathin section having a thickness of 5 to 10 μm is prepared in a cross-sectional direction of a plane perpendicular to the longitudinal direction of the fine fiber. For the preparation of this ultrathin section, for example, an ultramicrotome "MT6000 type" manufactured by Sorvall can be used.
(2) A fiber cross section in the ultrathin section is observed with a transmission electron microscope (TEM, for example, "H7700 type" manufactured by Hitachi High-Tech Corporation) at a magnification of 10,000 times.
(3) Using image analysis software (for example, "Win-ROOF" manufactured by Mitani Corporation), the equivalent-circle diameter of the particle diameter of the black pigment contained in a visual field of 2.3 μm×2.3 μm of the observation image is measured at 20 points. When the number of particles of the black pigment contained in a visual field of 2.3 μm×2.3 μm is less than 20, the equivalent-circle diameters of the particle diameters of the existing particles of the black pigment are all measured.
(4) The average value (arithmetic average) and the coefficient of variation (CV) are calculated for the particle diameters at the measured 20 points. In the present invention, the coefficient of variation is calculated by the following equation.

Coefficient of variation of particle diameter (%) =

(standard deviation of particle diameter)/

(arithmetic average of particle diameter) × 100.

The content of the black pigment contained in the resin that forms the fine fiber is preferably 0.1 mass % or more and 5.0 mass % or less relative to 100 mass % of the mass of the resin of the fine fiber. When the proportion of the black pigment is 0.1 mass % or more, preferably 1.0 mass % or more, more preferably 2.0 mass % or more, still more preferably 2.5 mass % or more, and most preferably 3.0 mass % or more, an artificial leather having deep color and excellent developability is obtained. When the proportion of the black pigment is 5.0 mass % or less, preferably 4.5 mass % or less, and more preferably 4.0 mass % or less, an artificial leather having high physical properties such as strength and elongation can be obtained.

In the present invention, the content of the black pigment contained in the resin that forms the fine fiber is calculated by the following method.
  (1) The artificial leather is immersed in a solution containing dimethylformamide or the like, and the polymer elastic body is removed to collect the fine fibers.
  (2) The resin of the collected fine fibers is dissolved using a mixed solution of phenol and tetrachloroethane, only the black pigment is then extracted, and the mass of the black pigment is measured.
  (3) Generated gas analysis is performed on the extracted black pigment, and a calibration curve for generated gas derived from the black pigment and the mass of the black pigment is created.
  (4) The artificial leather is subjected to de-dyeing treatment, the polymer elastic body is extracted with dimethylformamide or the like to leave only the fine fibers, and then the fine fibers are collected.
  (5) Generated gas analysis is performed on the collected fine fibers, and the proportion of the black pigment contained in the fine fibers is calculated from the detection intensity of generated gas derived from the black pigment and the calibration curve created in (3).

As the black pigment in the present invention, carbon-based black pigments such as carbon black and graphite, and oxide-based black pigments such as triiron tetraoxide and composite oxides of copper and chromium can be used. The black pigment is preferably carbon black from the viewpoint of easily obtaining a black pigment having a small particle diameter and excellent dispersibility in a polymer.

One of the constituent elements of the artificial leather of the present invention is a fiber-tangled body containing a nonwoven fabric made of fine fibers containing the polyester-based resin. In the present invention, a "fiber-tangled body containing a nonwoven fabric as a constituent element" refers to an aspect in which the fiber-tangled body is a nonwoven fabric, an aspect in which the fiber-tangled body is formed by entangling and integrating a nonwoven fabric and a woven fabric as described later, an aspect in which the fiber-tangled body is formed by entangling and integrating a nonwoven fabric and a base material other than a woven fabric, and the like. Forming the fiber-tangled body containing a nonwoven fabric as a constituent element makes it possible to provide an appearance and a texture that are uniform and elegant when the surface is napped.

Examples of the form of the nonwoven fabric include a long fiber nonwoven fabric mainly composed of filaments as well as a short fiber nonwoven fabric mainly composed of fibers of 100 mm or less. In a case of using the short fiber nonwoven fabric, the number of fibers oriented in the thickness direction of the artificial leather can be increased as compared with a case of using the long fiber nonwoven fabric, and the surface of the artificial leather when napped can have highly dense feeling and good touch sensation.

The fiber length of the fine fibers in a case of using the short fiber nonwoven fabric is preferably 25 mm or more and 95 mm or less. When the fiber length is 95 mm or less, more preferably 85 mm or less, and still more preferably 75 mm or less, good quality and texture are obtained. On the other hand, when the fiber length is 25 mm or more, more preferably 35 mm or more, and still more preferably 40 mm or more, an artificial leather excellent in wear resistance can be obtained.

The weight per unit area of the nonwoven fabric constituting the artificial leather according to the present invention is measured according to "6.2 Mass per Unit Area (ISO method)" in "Test methods for nonwovens" of JIS L1913: 2010, and is preferably in a range of 16 $g/m^2$ or more and 68 $g/m^2$ or less. When the weight per unit area of the nonwoven fabric is 16 $g/m^2$ or more, more preferably 25 $g/m^2$ or more, an artificial leather having uniform surface quality and no large pores can be obtained. On the other hand, when the weight per unit area of the nonwoven fabric is 68 $g/m^2$ or less, more preferably 60 $g/m^2$ or less, an artificial leather excellent in fire resistance can be obtained.

In the artificial leather of the present invention, for improving the strength and shape stability of the artificial leather, a woven fabric is layered, entangled and integrated inside or on one side of the nonwoven fabric to form a fiber-tangled body. As the type of fiber constituting the woven fabric used in a case where the woven fabric is entangled and integrated, it is preferable to use a filament yarn, a spun yarn, a mixed composite yarn of the filament yarn and the spun yarn, and the like, and it is more preferable to use a multifilament made of a polyester-based resin or a polyamide-based resin from viewpoints of durability, particularly mechanical strength, and the like.

When the average single fiber diameter of the fibers constituting the woven fabric is preferably 50.0 μm or less, more preferably 15.0 μm or less, and still more preferably 13.0 μm or less, an artificial leather excellent in flexibility is obtained, and even when the fibers of the woven fabric are exposed on the surface of the artificial leather, a hue difference from the fine fibers containing the pigment after dyeing is also reduced, so that hue uniformity on the surface is not impaired. On the other hand, when the average single fiber diameter is preferably 1.0 μm or more, more preferably 8.0 μm or more, and still more preferably 9.0 μm or more, the shape stability of a product as artificial leather is improved.

In the present invention, the average single fiber diameter of fibers constituting the woven fabric is calculated by photographing an SEM image of a cross section of the artificial leather with a scanning electron microscope (SEM, for example, "VHX-D500/D510" type manufactured by Keyence Corporation), randomly selecting 10 fibers constituting the woven fabric, measuring the single fiber diameters of the fibers, calculating the arithmetic average of the 10 fibers, and rounding the arithmetic average off to the first decimal place. When the fibers constituting the woven fabric are multifilaments, the total fineness of the multifilaments is measured according to "8.3.1 Fineness based on corrected mass b) Method B (simple method)" in "8.3 Fineness" of JIS L1013: 2010 "Testing methods for man-made filament yarns", and is preferably 30 dtex or more and 170 dtex or less.

When the total fineness of the yarns constituting the woven fabric is 170 dtex or less, an artificial leather excellent in flexibility is obtained. On the other hand, when the total fineness is 30 dtex or more, not only the shape stability of a product as the artificial leather is improved, but also the fibers that constitute the woven fabric are less likely to be exposed on the surface of the artificial leather when the nonwoven fabric and the woven fabric are entangled and integrated by needle punching or the like, which is preferable. At this time, the total fineness of the multifilaments of warps and wefts is preferably the same.

Furthermore, the yarns constituting the woven fabric preferably have a number of twist of 1,000 T/m or more and 4,000 T/m or less. When the number of twist is 4,000 T/m or less, more preferably 3,500 T/m or less, and still more preferably 3,000 T/m or less, an artificial leather excellent in flexibility is obtained. When the number of twist is 1,000 T/m or more, more preferably 1, 500 T/m or more, and still more preferably 2,000 T/m or more, in a case where a nonwoven fabric and a woven fabric are entangled and integrated by needle punching or the like, damage to fibers constituting the woven fabric can be prevented, and mechanical strength of the artificial leather is excellent, which is thus preferable.

[Polymer Elastic Body]

The polymer elastic body constituting the artificial leather of the present invention is a binder that holds the fine fibers contained in the fiber-tangled body constituting the artificial leather. From the viewpoint of realizing a soft texture of the artificial leather, the polymer elastic body to be used is preferably polyurethane.

As the polyurethane used in the present invention, either organic solvent-based polyurethane used in the state of being dissolved in an organic solvent or water-dispersible polyurethane used in the state of being dispersed in water can be used. Polyurethane obtained by reaction of a polymer diol, an organic diisocyanate, and a chain extender is preferably used as polyurethane used in the present invention.

As the polymer diol, for example, a polycarbonate-based diol, a polyester-based diol, a polyether-based diol, a silicone-based diol, and a fluorine-based diol can be used, and a copolymer of a combination of these diols can also be used. Among them, it is preferable to use a polycarbonate-based diol from the viewpoint of hydrolysis resistance and wear resistance. The polycarbonate-based diol can be produced by a transesterification reaction of an alkylene glycol with a carbonate ester, a reaction of phosgene or a chloroformate ester with an alkylene glycol, or the like.

In addition, examples of the alkylene glycol include linear alkylene glycols such as ethylene glycol, propylene glycol, 1,4-butanediol, 1,5-pentanediol, 1,6-hexanediol, 1,9-nonanediol, and 1,10-decanediol, branched alkylene glycols such as neopentyl glycol, 3-methyl-1,5-pentanediol, 2,4-diethyl-1,5-pentanediol, and 2-methyl-1,8-octanediol, alicyclic diols such as 1,4-cyclohexanediol, aromatic diols such as bisphenol A, glycerin, trimethylolpropane, and pentaerythritol. In the present invention, either a polycarbonate-based diol obtained from a single alkylene glycol or a copolymerized polycarbonate-based diol obtained from two or more alkylene glycols can be used.

In addition, examples of the polyester-based diol include polyester diols produced by condensing one of various low molecular weight polyols and a polybasic acid. As the low molecular weight polyol, for example, one or two or more polyols selected from the group consisting of ethylene glycol, 1,2-propylene glycol, 1,3-propylene glycol, 1,3-butanediol, 1,4-butanediol, 2,2-dimethyl-1,3-propanediol, 1,6-hexanediol, 3-methyl-1,5-pentanediol, 1,8-octanediol, diethylene glycol, triethylene glycol, dipropylene glycol, tripropylene glycol, cyclohexane-1,4-diol, and cyclohexane-1,4-dimethanol can be used. In addition, adducts obtained by adding various alkylene oxides to bisphenol A can also be used.

In addition, examples of the polybasic acid include one or two or more polybasic acids selected from the group consisting of succinic acid, maleic acid, adipic acid, glutaric acid, pimelic acid, suberic acid, azelaic acid, sebacic acid, dodecane dicarboxylic acid, phthalic acid, isophthalic acid, terephthalic acid, and hexahydroisophthalic acid.

Examples of the polyether-based diols used in the present invention include polyethylene glycol, polypropylene glycol, polytetramethylene glycol, and copolymerized diols which are formed by combining these substances.

The number average molecular weight of the polymer diol is preferably in a range of 500 or more and 4,000 or less in a case where the molecular weight of the polyurethane-based elastomer is constant. When the number average molecular weight is preferably 500 or more, more preferably 1,500 or more, it is possible to prevent the artificial leather from becoming stiff. In addition, when the number average molecular weight is preferably 4,000 or less and more preferably 3,000 or less, the strength as the polyurethane can be maintained.

Examples of the organic diisocyanate used in the present invention include aliphatic diisocyanates such as hexamethylene diisocyanate, dicyclohexylmethane diisocyanate, isophorone diisocyanate, and xylylene diisocyanate, and aromatic diisocyanates such as diphenylmethane diisocyanate and tolylene diisocyanate. These compounds can also be used in combination. As the chain extender, amine-based chain extenders such as ethylenediamine and methylenebisaniline, and diol-based chain extenders such as ethylene glycol can be preferably used. Furthermore, a polyamine which is obtained by reacting polyisocyanate and water can also be used as a chain extender.

The polyurethane used in the present invention may be used in combination with a crosslinker with the aim of improving waterproofness, wear resistance, hydrolysis resistance, and the like. The crosslinker may be an external crosslinker that is added as a third component to polyurethane, or an internal crosslinker that introduces reaction points to form a crosslinked structure in advance into the polyurethane molecular structure. It is preferable to use the internal crosslinker from a viewpoint that crosslinking points can be formed more uniformly in the polyurethane molecular structure and that a decrease in flexibility can be reduced. As the crosslinker, a compound having an isocyanate group, an oxazoline group, a carbodiimide group, an epoxy group, a melamine resin, a silanol group and the like can be used.

In general, the content of the polymer elastic body in the artificial leather can be appropriately adjusted in consideration of types of the polymer elastic body to be used, methods for producing the polymer elastic body, and the texture and physical properties, but in the present invention, the content of the polymer elastic body is preferably 10 mass % or more and 60 mass % or less relative to the mass of the fiber-tangled body. When the content of the polymer elastic body is 10 mass % or more, more preferably 15 mass % or more, and still more preferably 20 mass % or more, it is possible to enhance a bonding between the fibers by the polymer elastic body and to improve the wear resistance of the artificial leather. However, when the content of the polymer elastic body is 60 mass % or less, more preferably 45 mass % or less, and still more preferably 40 mass % or less, the artificial leather can be made more flexible.

The polymer elastic body may contain various additives including pigments such as inorganic and oxide-based pigments; flame retardants such as phosphorus, halogen, and inorganic flame retardants; antioxidants such as phenolic, sulfur, and phosphorus antioxidants; ultraviolet absorbers such as benzotriazole, benzophenone, salicylate, cyanoacrylate, and oxalic acid anilide ultraviolet absorbers; light stabilizers such as hindered amine and benzoate light stabilizers; hydrolysis stabilizers such as polycarbodiimide; plasticizers; antistatic agents; surfactants; coagulation modifiers; and dyes according to the purpose.

In the artificial leather of the present invention, for example, in order to achieve both deep color and uniform color developability, the polymer elastic body can contain a black pigment, and the black pigment preferably has an average particle diameter of 0.05 µm or more and 0.20 µm or less. The average particle diameter of the black pigment herein refers to an average particle diameter in a state where the black pigment is present in the polymer elastic body, and is generally a secondary particle diameter.

When the average particle diameter of the black pigment is 0.05 µm or more, preferably 0.07 µm or more, the black pigment is held inside the polymer elastic body, so that falling off of the pigment from the polymer elastic body is suppressed. When the average particle diameter is 0.20 µm or less, preferably 0.18 µm or less, more preferably 0.16 µm or less, dispersibility is excellent when the polymer elastic body is impregnated.

The coefficient of variation (CV) of the particle diameter of the black pigment is preferably 75% or less. When the coefficient of variation (CV) of the particle diameter of the black pigment is 75% or less, preferably 65% or less, more preferably 60% or less, still more preferably 55% or less, and most preferably 50% or less, a distribution of the particle diameter becomes small, and falling off of small particles from a surface of the polymer elastic body, precipitation of significantly aggregated particles in an impregnation tank, and the like are suppressed. The lower limit of the coefficient of variation in particle diameter in the present invention is not particularly limited, but is preferably 0.1% or more from the viewpoint of operability when the polymer elastic body is impregnated.

In the present invention, the average particle diameter and the coefficient of variation (CV) of the black pigment contained in the polymer elastic body are calculated using the above-described method for calculating the black pigment contained in the fine fibers, and are measured by preparing an ultrathin section having a thickness of 5 to 10 µm in a cross-sectional direction of a plane perpendicular to the longitudinal direction of the artificial leather and using a cross-sectional image of the polymer elastic body.

In addition, the content of the black pigment contained in the polymer elastic body is preferably 0.01 mass % or more and 5.0 mass % or less relative to the mass of the polymer elastic body. When the proportion of the pigment is 0.01 mass % or more, preferably 0.1 mass % or more, and more preferably 1.0 mass % or more, an artificial leather having deep color and excellent developability is obtained. When the proportion of the pigment is 5.0 mass % or less, preferably 4.5 mass % or less, and more preferably 4.0 mass % or less, an artificial leather having high physical properties such as strength can be obtained. The content of the black pigment contained in the polymer elastic body is calculated using the above-described method for calculating the black pigment contained in the fine fiber, and is measured by extracting the polymer elastic body from the artificial leather. Specifically, the artificial leather is immersed in a mixed solution of phenol and tetrachloroethane to dissolve the fine fibers, the polymer elastic body is collected, and the collected polymer elastic body is dissolved using dimethylformamide or the like to extract the black pigment.

As the black pigment in the present invention, carbon-based black pigments such as carbon black and graphite, and oxide-based black pigments such as triiron tetraoxide and composite oxides of copper and chromium can be used. The black pigment is preferably carbon black from the viewpoint of easily obtaining a black pigment having a small particle diameter and excellent dispersibility in a polymer.

[Artificial Leather]

The artificial leather of the present invention is an artificial leather including the above-described fiber-tangled body and the above-described polymer elastic body, and satisfies the following requirements:

requirement 1: the artificial leather has a weight per unit area of 25 g/m$^2$ or more and 75 g/m$^2$ or less; and requirement 2: the number per unit area of micropores penetrating the artificial leather in the thickness direction and having a pore diameter of 35 µm or more and 500 µm or less is 0.1/mm$^2$ or more and 5.0/mm$^2$ or less.

First, in the present invention, the artificial leather has a weight per unit area of 25 g/m$^2$ or more and 75 g/m$^2$ or less. The present inventors have found that the weight per unit area of the artificial leather of the skin is as low as 75 g/m$^2$ or less so that the total amount of heat at the time of combustion is equal to or less than a specified value with respect to the fire resistance of a material for wallpaper. Although the material for wallpaper varies depending on the configuration of the base material, the adhesive layer with a skin material, and the like, it is important that the artificial leather has a small weight per unit area. When the weight per unit area of the artificial leather is 25 g/m$^2$ or more, more preferably 35 g/m$^2$ or more, penetration of pores having a pore diameter exceeding 500 µm in the thickness direction is suppressed, and an artificial leather having uniform surface quality can be obtained. On the other hand, when the weight per unit area of the artificial leather is 75 g/m$^2$ or less, more preferably 70 g/m$^2$ or less, the total amount of heat generated at the time of combustion can be suppressed, and an artificial leather having fire resistance required as a material for wallpaper can be obtained.

The weight per unit area of the artificial leather of the present invention is measured according to "6.2 Mass per Unit Area (ISO method)" in Test methods for nonwovens of JIS L1913: 2010, and is measured and calculated as follows.

(1) Three test pieces each having a size of 30 cm×30 cm are collected from artificial leather.

(2) The mass of each test piece of (1) is measured.

(3) The mass per unit area of each test piece is calculated by the following equation.

Mass per unit area $(g/m^2)$ = mass of test piece $(g)$/area of test piece $(m^2)$ (4) A value obtained by rounding the arithmetic average $(g/m^2)$ of the mass per unit area obtained in (3) down to the nearest decimal point is employed as the weight per unit area of the artificial leather.

Next, in the present invention, the artificial leather has micropores penetrating the artificial leather in the thickness direction and having a pore diameter of 35 µm or more and 500 µm or less, and the number per unit area of the micropores is 0.1/mm$^2$ or more and 5.0/mm$^2$ or less (hereinafter, the number per unit area of micropores having a pore diameter of 35 µm or more and 500 µm or less may be simply abbreviated as "the number of micropores").

When the number of micropores is 0.1/mm$^2$ or more, more preferably 0.5/mm$^2$ or more, an artificial leather having a weight per unit area in a predetermined range is obtained, and combustion of the artificial leather can be suppressed in the case of fire. On the other hand, when the number of micropores is 5.0/mm² or less, more preferably 4.0/mm² or more, an artificial leather having good touch sensation and dense and uniform surface quality is obtained. When at least one pore having a pore diameter exceeding 500 µm exists in the artificial leather, dense and uniform surface quality is not obtained. Furthermore, when the number per unit area of micropores having a pore diameter of 35 µm or more and 500 µm or less in the artificial leather is less than 0.1/mm², the weight per unit area increases. Dense and uniform surface quality results in uniform and elegant surface quality. In order to achieve both good touch sensation and dense and uniform surface quality, the artificial leather of the present invention has micropores penetrating the artificial leather in the thickness direction and having a pore diameter of 35 µm or more and 500 µm or less with the number per unit area of 0.1/mm² or more and 5.0/mm² or less.

In the method for obtaining the artificial leather of the present invention, a first widening is performed on a sheet including the fiber-tangled body and the polymer elastic body, the sheet is then dyed, and a second widening is performed, whereby generation of large micropores penetrating the artificial leather can be suppressed even at a low weight per unit area. When the degree of widening is increased with respect to the dyed sheet, large pores penetrating the artificial leather in the thickness direction are likely to be generated. When a first widening is performed on a sheet including the fiber-tangled body and the polymer elastic body, then the sheet is dyed, and a second widening is performed, uniform surface quality, dense feeling, and smooth surface touch sensation are achieved.

In addition, the average pore diameter of micropores penetrating the artificial leather in the thickness direction (hereinafter, may be abbreviated as "average pore diameter of micropores") is preferably 35 µm or more and 100 µm or less. When the average pore diameter of the micropores is 35 µm or more, more preferably 50 µm or more, an artificial leather having a weight per unit area in a predetermined range is obtained, and combustion of the artificial leather can be suppressed in the case of fire. On the other hand, when the average pore diameter of the micropores is 100 µm or less, more preferably 80 µm or less, an artificial leather having good touch sensation and dense and uniform surface quality is obtained.

In the present invention, the number of micropores and the average pore diameter of the micropores are calculated by the following method.
(1) Ten test pieces each having a size of 15 cm×15 cm are collected from artificial leather.
(2) The surface of the test piece is photographed at a magnification of 20 times with a digital microscope (for example, "VHX-5000" manufactured by Keyence Corporation) while the test piece is irradiated with transmitted illumination (in the case of "VHX-5000" manufactured by Keyence Corporation, the output is set to 97 with respect to the output setting range of 0 to 255), and the obtained microscope image (see FIG. 2) is trimmed so that the visual field of the observation image is 12.9 mm×17.2 mm (area: 221.5 mm²). The light having been transmitted through the micropore penetrating the artificial leather in the thickness direction represents the size of the micropore, and the area of the micropore can be analyzed from the obtained image. In FIG. 2, white dots indicate micropores.
(3) The image obtained in (2) is binarized using image analysis software (for example, "ImageJ") with a threshold set to 130 (see FIG. 3). Note that, before the binarization, the scale is set by image analysis software according to the scale of the image obtained in (2).
(4) When the scale is displayed on the image (FIG. 3) obtained in (3), the portion of the scale on the image is filled with a color adjusted according to the background color (white or black).
(5) The image obtained in (4) is processed (in the case of "ImageJ" described above, the "Convert to Mask" processing) using image analysis software, to thereby obtain an image in which the black portion and the white portion are reversed (see FIG. 4).
(6) The number and the area of micropores having a pore diameter of 35 µm or more and 500 µm or less present in the image obtained in (5) are analyzed using image analysis software. In the case of "ImageJ", the analysis is performed under the following conditions using the function of "Analyze Particles".
Size: 99 to 99999999 µm²
Circularity: condition of 0 to 1
show: Masks
Exclude on edges.
(7) The equivalent-circle diameter is calculated from the area of the micropore obtained by the analysis in (6), the number per unit area of micropores having an equivalent-circle diameter of 35 µm or more and 500 µm or less is counted, and the number of micropores having a pore diameter of 35 µm or more and 500 µm or less is calculated by the following equation.

Number of micropores (number/mm²) =

(number of micropores having equivalent–circle diameter of 35 $\mu$m or more and 500 $\mu$m or less)/(field area of observation image)

(8) The average value (arithmetic average) of the equivalent-circle diameters of the micropores calculated in (7) is calculated and defined as the average pore diameter of the micropores penetrating the artificial leather in the thickness direction.

As the image analysis software, the image analysis software "ImageJ" described above is exemplified, but the image analysis software is not limited to the image analysis software "ImageJ" as long as the image analysis software includes image processing software having a function of calculating a specified area ratio of pixels. Note that the image analysis software "ImageJ" is common software, and is developed by the National Institutes of Health. The image processing software "ImageJ" has a function of specifying a necessary region and performing pixel analysis on the captured image.

The artificial leather of the present invention preferably has a thickness of 0.2 mm or more and 0.8 mm or less as measured according to "6.1.1 A method" in "6.1 Thickness (ISO method)" of JIS L1913: 2010 "Test methods for nonwovens". When the thickness of the artificial leather is 0.2 mm or more, more preferably 0.3 mm or more, an artificial leather that is not only excellent in processability in the production but also easy to be bonded as a material for wallpaper can be obtained. On the other hand, when the thickness is 0.8 mm or less, more preferably 0.7 mm or less, an artificial leather excellent in texture and touch sensation can be obtained.

In the artificial leather of the present invention, it is preferable to have raised nap on the surface. The raised nap may be provided only on one surface of the artificial leather, and is also allowed to be provided on both surfaces. As for the form of raised nap in a case where the artificial leather has raised nap on the surface, the raised nap preferably has a length and directional flexibility to such an extent that traces remain when the artificial leather is stroked with a finger, that is, a so-called finger mark remain due to a change of direction of the raised nap from a viewpoint of design effects.

More specifically, the nap length on the surface is preferably 200 μm or more and 600 μm or less, and more preferably 250 μm or more and 500 μm or less. When the nap length is 200 μm or more, the surface smoothness of the artificial leather is improved, and an artificial leather excellent in touch sensation can be obtained. On the other hand, when the nap length is 600 μm or less, an artificial leather excellent in design effects and wear resistance can be obtained.

In the present invention, the nap length of the artificial leather is calculated by the following method.
(1) A thin section with a thickness of 1 mm is prepared in a cross-sectional direction of a plane perpendicular to the longitudinal direction of the artificial leather in a state where the raised nap of the artificial leather is ruffed by using a lint brush or the like.
(2) The cross section of the artificial leather is observed with a scanning electron microscope (SEM, for example, "VHX-D500/D510" manufactured by Keyence Corporation) at a magnification of 90 times.
(3) In an SEM image photographed, a height of a nap portion (a layer including only the fine fibers) is measured at 10 points at intervals of 200 μm in the width direction of the cross section of the artificial leather.
(4) The average value (arithmetic average) of the measured heights at 10 points of the nap portion (a layer including only the fine fibers, that is, a fiber portion not held by the polymer elastic body) is calculated.

In the artificial leather of the present invention, the proportion (hereinafter, may be abbreviated as nap coverage) of raised nap covering the surface of the artificial leather is preferably 50% or more and 98% or less, and more preferably 60% or more and 96% or less. When the nap coverage is 50% or more, more preferably 60% or more, the surface smoothness of the artificial leather is improved, and an artificial leather excellent in touch sensation can be obtained.

The nap coverage is obtained by enlarging a nap surface at an observation magnification of 30 times to 90 times such that the presence of raised nap can be recognized by SEM (for example, "VHX-D500/D510" manufactured by Keyence Corporation), and calculating the ratio of the total area of nap portions per total area of 9 mm² using image analysis software. The ratio of the total area can be calculated by binarizing the photographed SEM image by using image analysis software (for example, "ImageJ") in such a manner that the nap portion and the non-nap portion are set to a threshold of 100. In addition, in the calculation of the nap coverage, in a case where a substance that is not a raised nap is calculated as the raised nap and greatly affects the nap coverage, the image is manually edited and the portion is calculated as a non-nap portion.

As the image analysis system, the image analysis software "ImageJ" described above is exemplified, but the image analysis system is not limited to the image analysis software "ImageJ" as long as the image analysis system includes image processing software having a function of calculating a specified area ratio of pixels.

In the artificial leather of the present invention, the total amount of heat generated, as measured by a heat release test (radiant heat 50 kW/m², heating time 10 minutes) with a cone calorimeter tester in accordance with ISO 5660-1: 2015, is preferably 3 MJ/m² or less. When the total amount of heat generated is 3 MJ/m² or less, more preferably 2.5 MJ/m² or less, and still more preferably 2 MJ/m² or less, combustion of the artificial leather can be suppressed in the case of fire. The total amount of heat generated of the artificial leather in the present invention is better as it is smaller, but the lower limit is not particularly limited.

In the artificial leather of the present invention, the rubbing fastness measured by a "9.1 rubbing tester type I (clock meter) method" according to JIS L0849: 2013 "Test methods for color fastness to rubbing" and light fastness measured by a "7.2 Exposure method a) First exposure method" according to JIS L0843: 2006 "Test method for color fastness to light of xenon arc lamp" are each preferably grade 3 or higher. When the rubbing fastness and the light fastness are grade 3 or higher, it is possible to prevent color loss and contamination of clothes and the like during practical use. For the determination of the grade for each fastness, the gray scale for contamination specified in JIS L0805: 2005 "Grey scale for assessing staining" is used for the rubbing fastness of the artificial leather, and the gray scale for discoloration specified in JIS L0804: 2004 "Grey scale for assessing change in colour" is used for the light fastness of the artificial leather.

In addition, in the artificial leather of the present invention, in a wear resistance test measured by "8.19.5 E method (Martindale method)" in "8.19 Wear strength and rubbing discoloration property" of JIS L1096: 2010 "Testing methods for woven and knitted fabrics," a weight loss which is the amount of wear of the artificial leather after rubbing is performed 20,000 times under a pressing load of 12.0 kPa is preferably 10 mg or less, more preferably 8 mg or less, and still more preferably 6 mg or less. When the weight loss is 10 mg or less, it is possible to prevent contamination due to fluff dropping during practical use.

Furthermore, in the artificial leather of the present invention, the lightness (L* value) of the surface is preferably 40 or less, more preferably 35 or less, and still more preferably 30 or less.

In the artificial leather of the present invention, the tensile strength as measured in accordance with 6.3.1 Tensile strength and elongation percentage (ISO method) in Test methods for nonwovens of JIS L1913: 2010 is preferably 3 N/cm or more and 50 N/cm or less in optional measurement direction. When the tensile strength is 3 N/cm or more, more preferably 5 N/cm or more, and still more preferably 7 N/cm or more, the artificial leather is excellent in shape stability and durability, which is thus preferable. When the tensile strength is 50 N/cm or less, more preferably 40 N/cm or less, and still more preferably 30 N/cm or less, the artificial leather is easy to be bonded as a material for wallpaper.

[Method for Producing Artificial Leather]

The artificial leather of the present invention is preferably produced by including the following steps (1) to (5).
Step (1): Step of producing a nonwoven fabric or a fiber-tangled body containing fine fiber-generating fibers as a main component
Step (2): Step of generating fine fibers from the nonwoven fabric or fiber-tangled body containing fine fiber-generating fibers as a main component
Step (3): Step of applying a polymer elastic body
Step (4): First widening step of buffing and widening the obtained sheet Step (5): Second widening step of dyeing and widening the obtained sheet Hereinafter, details of each step will be described.

<Step of Producing Nonwoven Fabric or Fiber-Tangled Body Containing Fine Fiber-Generating Fibers as Main Component>

In this step, an island portion formed of a melt-spinnable thermoplastic resin is first formed, and fine fiber-generating fibers having an islands-in-the-sea fiber structure in which an easily soluble polymer forms a sea portion are produced. The produced fine fiber-generating fibers are called raw stock.

As the fine fiber-generating fibers, islands-in-the-sea fibers are used in which thermoplastic resins having different solvent solubilities are used as a sea portion (easily soluble polymer) and an island portion (hardly soluble polymer), and the sea portion is dissolved and removed using a solvent or the like to cause the island portion to form a fine fiber. Use of the islands-in-the-sea fibers is favorable in view of the texture or surface quality when the artificial leather is fabricated using these fibers, because at the time of removing the sea portion, a suitable gap can be provided between island portions, that is, between fine fibers inside a fiber bundle.

As the method of spinning the fine fiber-generating fibers having an islands-in-the-sea fiber structure, a method using a mutually arranged polymer body in which a spinneret for islands-in-the-sea fibers is used and the fibers are spun by mutually arranging a sea portion and an island portion is preferred from the viewpoint that fine fibers having a uniform single fiber fineness are obtained.

In the present invention, a black pigment may also be contained in the island portion for the purpose of achieving both deep color and uniform color developability. As a method therefor, a method of spinning using polyester-based resin chips prepared by kneading a polyester-based resin with a black pigment in advance in an amount of, for example, 0.1 mass % or more and 5.0 mass % or less relative to the mass of the polyester-based resin, and a method of mixing polyester-based resin chips with a masterbatch prepared by kneading a polyester-based resin with a black pigment in an amount of, for example, 10 mass % or more and 40 mass % or less relative to the mass of the polyester-based resin, and spinning using the mixture can be adopted. Among them, a method of mixing polyester-based resin chips with a masterbatch is preferable because the amount of pigment contained in the fine fibers can be appropriately adjusted.

When the masterbatch is mixed with the polyester-based resin chips, it is preferable to use a masterbatch in which the number average of primary particle diameters of the black pigment contained in the masterbatch to be used is 0.01 μm or more and 0.05 μm or less and the coefficient of variation (CV) is 0.1% or more and 30% or less. When a masterbatch having a primary particle diameter within the above range is used, the particle diameter (secondary particle diameter) and the coefficient of variation (CV) in the fine fibers can be set within appropriate ranges.

As the sea portion of the islands-in-the-sea fibers, for example, a copolymerized polyester obtained by copolymerizing polyethylene, polypropylene, polystyrene, sodium sulfoisophthalic acid, polyethylene glycol or the like, and polylactic acid can be used, but polystyrene or copolymerized polyester is preferably used from the viewpoint of yarn making property, easy elutability, and the like.

In the method for producing an artificial leather of the present invention, in the case of using the islands-in-the-sea fibers, islands-in-the-sea fibers in which the tensile strength of the island portion (tensile strength of the fine fiber) is 2.2 cN/dtex or more are preferably used. When the tensile strength of the island portion is 2.2 cN/dtex or more, more preferably 2.5 cN/dtex or more, still more preferably 3.0 cN/dtex or more, the wear resistance of the artificial leather is enhanced, and at the same time, reduction in the rubbing fastness due to falling off of the fiber can be suppressed.

In the present invention, the tensile strength of the island portion of the islands-in-the-sea fiber (tensile strength of the fine fiber) is calculated by the following method.

(1) Ten islands-in-the-sea fibers having a length of 20 cm are bundled.

(2) The sea portion is dissolved and removed from the sample of (1), and an air drying is performed.

(3) A test is performed 10 times (N=10) under conditions of a distance between chucks of 5 cm, a tensile speed of 5 cm/min, and a load of 2 N according to "8.5.1 Standard time test" in "8.5 Tensile strength and elongation percentage" of JIS L1013: 2010 "Testing methods for man-made filament yarns".

(4) A value obtained by rounding the arithmetic average (cN/dtex) of the test results of (3) to the first decimal place is employed as the tensile strength of the island portion of the islands-in-the-sea fiber, that is the tensile strength of the fine fiber.

In this step, the spun-out fine fiber-generating fibers are opened and passed through a cross wrapper, or the like to form a fiber web, and the fiber web is then entangled to obtain a nonwoven fabric. As the method for obtaining the nonwoven fabric by entangling the fiber web, needle punching, water jet punching, and the like can be used.

As a form of the nonwoven fabric, either the short fiber nonwoven fabric or the long fiber nonwoven fabric can be used as described above, but in the case of the short fiber nonwoven fabric, the number of fibers oriented in the thickness direction of the artificial leather is larger than that of the long fiber nonwoven fabric, and highly dense feeling can be obtained on the surface of the artificial leather when napped. In a case where a short fiber nonwoven fabric is used for the nonwoven fabric, the obtained fine fiber-generating fibers are preferably crimped, cut to a predetermined length to obtain a raw stock, then opened, layered, and entangled, thereby obtaining a short fiber nonwoven fabric. Generally known methods may be used for the crimping and cutting.

In addition, when the artificial leather includes the woven fabric, the obtained nonwoven fabric and the woven fabric are layered and then entangled and integrated. For the entanglement and integration of the nonwoven fabric and the woven fabric, the woven fabric can be layered on one surface or both surfaces of the nonwoven fabric, or fibers of the nonwoven fabric and the woven fabric can be entangled by needle punching, water jet punching, or the like after the woven fabric is sandwiched between a plurality of nonwoven fabric webs.

The apparent density of the nonwoven fabric including fine fiber-generating fibers after needle punching or water jet punching is preferably 0.15 g/cm$^3$ or more and 0.45 g/cm$^3$ or less. When the apparent density is preferably 0.15 g/cm$^3$ or more, an artificial leather having a sufficiently high shape stability and dimensional stability can be obtained. On the other hand, when the apparent density is preferably 0.45 g/cm$^3$ or less, a sufficient space for applying the polymer elastic body can be kept.

The nonwoven fabric may be subjected to a heat shrinking treatment with warm water or steam for improving the dense feeling of the fibers. The nonwoven fabric may be impregnated with an aqueous solution of a water-soluble resin and dried to thereby add the water-soluble resin to the nonwoven fabric. When the water-soluble resin is applied to the nonwoven fabric, the fibers are fixed and the dimensional stability is improved.

<Step of Generating Fine Fibers>

In this step, the obtained nonwoven fabric or fiber-tangled body containing the nonwoven fabric is treated with a solvent to generate fine fibers having an average single fiber diameter of 0.01 µm or more and 10.0 µm or less. The generation of fine fibers is carried out by, for example, immersing the nonwoven fabric formed of islands-in-the-sea fibers in a solvent to ensure dissolution and removal of the sea portion of the islands-in-the-sea fibers. In a case where the sea portion is polyethylene, polypropylene, or polystyrene, an organic solvent such as toluene or trichloroethylene can be used as the solvent for dissolving and removing the sea portion. An aqueous alkali solution of sodium hydroxide or the like can be used when the sea portion is copolymerized polyester or polylactic acid. Hot water can be used when the sea portion is water-soluble thermoplastic polyvinyl alcohol-based resin.

<Step of Applying Polymer Elastic Body>

In this step, the nonwoven fabric made of fine fibers or the fiber-tangled body containing the nonwoven fabric is impregnated with a solution of a precursor of a polymer elastic body, and the precursor of the polymer elastic body is solidified to thereby apply the polymer elastic body. As the fine fibers, the fine fiber-generating fibers described above can be used. The polymer elastic body may be applied to the fiber-tangled body before generating fine fibers from the fine fiber-generating fibers, or after generating fine fibers from the fine fiber-generating fibers. Here, the precursor of the polymer elastic body refers to a precursor (hereinafter, may be simply abbreviated as "precursor") that becomes a polymer elastic body by means such as coagulation and solidification described later. For example, when a polyurethane resin is used as a polymer elastic body contained as a constituent element of the artificial leather, reaction components of the polyurethane resin, that is, a resin mixture of a polymer diol, an organic diisocyanate, a chain extender, and the like are a precursor of the polymer elastic body.

In the present invention, it is also possible to fix a polymer elastic body containing a black pigment to the nonwoven fabric for the purpose of achieving both deep color and uniform color developability. As the method of fixing the polymer elastic body containing a black pigment, there is a method of impregnating a solution of a precursor of the polymer elastic body containing a black pigment into the nonwoven fabric or fiber-tangled body and then subjecting the resultant to wet coagulation or dry coagulation, and these methods can be appropriately selected according to the type of the polymer elastic body to be used. As the black pigment to be used, a black pigment in which the number average of primary particle diameters is 0.01 µm or more and 0.05 µm or less, and the coefficient of variation (CV) is 0.1% or more and 30% or less is preferable. When a black pigment having a primary particle diameter within the above range is used, the particle diameter (secondary particle diameter) and the coefficient of variation (CV) in the polymer elastic body can be set within appropriate ranges.

N,N'-dimethylformamide, dimethyl sulfoxide, or the like is preferably used as the solvent used when polyurethane is applied as the polymer elastic body to the fiber-tangled body. In addition, a water-dispersible polyurethane liquid in which the polyurethane is dispersed in water as an emulsion may be used.

<Step of Buffing and Widening Obtained Sheet (First Widening Step)>

In this step, a step of buffing and widening a sheet prepared by applying the polymer elastic body to the nonwoven fabric made of fine fibers, obtained after completion of the above-described step, that is, a first widening step is performed. From the viewpoint of the production efficiency, it is also a preferable aspect that prior to the buffing, the sheet to which the polymer elastic body has been applied is cut in half in the thickness direction to form two half-cut sheets. The sheet or the half-cut sheet is buffed. As a result, the surface of the sheet has raised nap, and a nap surface is formed on the surface of the sheet. The buffing can be performed by a method using sandpaper, a roll sander, or the like. The buffing can be performed only on one surface or both surfaces of the sheet, but is preferably performed only on one surface. When buffing is performed only on one surface, a state where the density of one surface not subjected to buffing is high can be maintained, so that breakage of the sheet can be suppressed when the sheet is widened by 25% or more and 40% or less. Prior to this buffing, a lubricant such as a silicone emulsion can be applied to the surface of the sheet. In addition, when an antistatic agent is applied before the buffing, a powder generated from the artificial leather by buffing is less likely to be deposited on the sandpaper.

Here, the weight per unit area of the sheet obtained after the buffing is preferably 80 g/m$^2$ or more and 110 g/m$^2$ or less. When the weight per unit area of the sheet obtained after the buffing is 80 g/m$^2$ or more, breakage of the sheet in this widening step can be suppressed. On the other hand, when the weight per unit area of the sheet is preferably 110 g/m$^2$ or less, the weight per unit area of the artificial leather obtained in the second widening step can be more easily reduced, and the total amount of heat generated at the time of combustion is suppressed, so that an artificial leather excellent in fire resistance required as a material for wallpaper can be obtained.

Next, before dyeing the buffed sheet, it is preferable to widen the buffed sheet by 25% or more and 40% or less with respect to the width of the sheet. When the sheet is widened by preferably 25% or more, more preferably 30% or more with respect to the width of the sheet before dyeing the sheet, the weight per unit area of the artificial leather can be easily reduced. On the other hand, when the sheet is widened by preferably 40% or less and more preferably 35% or less with respect to the width of the sheet, it is possible to suppress generation of large pores penetrating the artificial leather in the thickness direction, and to achieve uniform surface quality, and dense feeling and smooth surface touch sensation.

<Step of Dyeing and Widening Obtained Sheet (Second Widening Step)>

The sheet widened in the first widening step is subsequently dyed and further widened, that is, a second widening step is performed. The sheet is dyed between the first widening step and the second widening step. The artificial leather of the present invention can be obtained by performing widening before dyeing, and further performing second widening after dyeing.

As a dyeing method, for example, a jet dyeing treatment using a jigger dyeing machine or a jet dyeing machine, a dip dyeing treatment such as a thermosol dyeing treatment using a continuous dyeing machine, or a textile printing treatment on a nap surface by roller textile printing, screen textile printing, inkjet textile printing, sublimation textile printing, vacuum sublimation textile printing, or the like can be used. Among them, it is preferable to use a jet dyeing machine from the viewpoint of quality and surface appearance because the soft texture can be obtained. In addition, various resin finishing processes can be performed after dyeing as necessary.

The dyed sheet is preferably further widened by 3% or more and 10% or less with respect to the width of the sheet. When the sheet is widened by 25% or more and 40% or less with respect to the width of the sheet in the first widening step, then dyed, and widened by 3% or more and 10% or less with respect to the width of the dyed sheet in the second widening step, it is possible to achieve, for the first time, both reduction in weight per unit area and suppression of generation of large pores penetrating the artificial leather in the thickness direction. When the sheet is widened by preferably 3% or more, more preferably 4% or more with respect to the width of the dyed sheet in the second widening step, it is possible to easily achieve reduction in weight per unit area of the artificial leather. On the other hand, when the sheet is widened by preferably 10% or less, more preferably 8% or less with respect to the width of the dyed sheet in the second widening step, it is possible to suppress generation of large pores penetrating the artificial leather in the thickness direction, and to achieve uniform surface quality and dense feeling and smooth surface touch sensation.

<Post-Processing Step>

In addition, designability can be imparted to a surface of the artificial leather as necessary. For example, post-processing including drilling such as perforation, embossing, laser processing, pinsonic processing, and print processing can be performed.

The artificial leather of the present invention obtained by the production method exemplified above achieves uniform and elegant surface quality, good touch sensation, and wear resistance while suppressing the total amount of heat generated at the time of combustion due to its low weight per unit area, and thus is suitably used as a material for wallpaper.

[Composite Artificial Leather]

The composite artificial leather of the present invention is illustrated in FIG. 1. In the composite artificial leather, a base layer 3 is provided on one surface of an artificial leather 1 with an adhesive layer 2 interposed therebetween. The main component of the adhesive layer 2 is preferably at least one selected from the group consisting of a vinyl acetate-based resin, an ethylene-vinyl acetate copolymer-based resin, a polypropylene-based resin, a polyethylene-based resin, an acrylic resin, and a vinyl chloride-based resin. Here, in the present invention, the "composite artificial leather including an artificial leather and a base layer provided on one surface of the artificial leather with an adhesive layer interposed therebetween" refers to a composite artificial leather including the artificial leather 1, the adhesive layer 2 and the base layer 3 layered in this order. The composite artificial leather may have other constituent elements as long as it has the configuration of "artificial leather/adhesive layer/base layer" and the object of the present invention is not hindered. For example, a resin layer may be provided on at least a part of the surface of the artificial leather on the side opposite to the adhesive layer 2, and a so-called a semi-grain leather-like texture can be imparted to the surface on which the resin layer is provided.

The main component of the adhesive layer 2 according to the composite artificial leather of the present invention is preferably at least one resin selected from the group consisting of a vinyl acetate-based resin, an ethylene-vinyl acetate copolymer-based resin, a polypropylene-based resin, a polyethylene-based resin, an acrylic resin, and a vinyl chloride-based resin. Here, in the composite artificial leather of the present invention, the main component of the adhesive layer refers to a resin contained in an amount of 80 mass % or more based on 100 mass % of the resin composition of the adhesive layer.

In the adhesive layer according to the composite artificial leather of the present invention, when the main component of the adhesive layer is at least one selected from the above group, in particular, when the main component of the adhesive layer is an ethylene-vinyl acetate copolymer-based resin, it is possible to obtain a composite artificial leather having higher strength and dimensional stability while improving adhesion between the artificial leather and the base material.

The adhesive layer 2 according to the composite artificial leather of the present invention preferably has a weight per unit area of 20 g/m$^2$ or more and 45 g/m$^2$ or less. When the lower limit of the range of the weight per unit area of the adhesive layer is preferably 20 g/m$^2$ or more, more preferably 25 g/m$^2$ or more, and still more preferably 30 g/m$^2$ or more, the adhesion between the artificial leather and the base material and the strength of the composite artificial leather can be improved. On the other hand, when the upper limit of the range of the weight per unit area of the adhesive layer is preferably 45 g/m$^2$ or less, more preferably 40 g/m$^2$ or less, and still more preferably 35 g/m$^2$ or less, the weight per unit area of the composite artificial leather can be reduced, and a composite artificial leather having fire resistance required as a wallpaper can be obtained.

Next, the base layer according to the composite artificial leather of the present invention is not particularly limited as long as the object of the present invention is not hindered, and for example, a woven fabric, a knitted fabric, a nonwoven fabric, paper, a film, a foam, a metal foil, and a rubber sheet can be used. In particular, when the composite artificial leather is used as a material for wallpaper, general paper is preferably used, and for example, paper containing only natural pulp as a pulp component and containing no synthetic resin can be used.

The base layer 3 according to the composite artificial leather of the present invention preferably has a weight per unit area of 50 g/m$^2$ or more and 120 g/m$^2$ or less. When the lower limit of the range of the weight per unit area of the base layer is preferably 50 g/m$^2$ or more, more preferably 60 g/m$^2$ or more, and still more preferably 70 g/m$^2$ or more, a composite artificial leather excellent in bondability at the time of fabrication while improving the strength of the composite artificial leather can be obtained. On the other hand, when the upper limit of the range of the weight per unit area of the base layer is preferably 120 g/m$^2$ or less, more preferably 110 g/m$^2$ or less, and still more preferably 100 g/m$^2$ or less, the weight per unit area of the artificial leather of the composite artificial leather can be reduced, and a composite artificial leather having fire resistance required as a wallpaper can be obtained.

The composite artificial leather of the present invention preferably has a weight per unit area of 150 g/m$^2$ or more and 215 g/m$^2$ or less. When the lower limit of the range of the weight per unit area of the composite artificial leather is preferably 150 g/m$^2$ or more, more preferably 170 g/m$^2$ or more, a composite artificial leather excellent in workability at the time of fabrication while improving the strength of the composite artificial leather can be obtained. On the other hand, when the upper limit of the range of the weight per unit area of the composite artificial leather is preferably 215 g/m² or less, and more preferably 210 g/m² or less, the total amount of heat generated at the time of combustion can be suppressed, and an artificial leather having fire resistance required as a wallpaper can be obtained.

The weight per unit area of the composite artificial leather of the present invention is measured in the same manner as in the method for measuring the weight per unit area of the artificial leather described above. The weight per unit area is measured according to 6.2 Mass per unit area (ISO method) in Test methods for nonwovens of JIS L1913: 2010.

In the composite artificial leather of the present invention, the total amount of heat generated, as measured by a heat release test (radiant heat 50 kW/m², heating time 10 minutes) with a cone calorimeter tester in accordance with ISO 5660-1:2015, is preferably 8 MJ/m² or less. When the total amount of heat generated is preferably 8 MJ/m² or less, and more preferably 6 MJ/m² or less, combustion of the artificial leather in the case of fire can be suppressed. The lower limit of the total amount of heat generated of the composite artificial leather in the present invention is not particularly limited.

The method for producing a composite artificial leather of the present invention includes a step of layering the adhesive layer and the base layer on the artificial leather. The layering method can be appropriately selected according to the characteristics of the adhesive layer, and when the adhesive layer is formed by curing a liquid adhesive, examples thereof include a method in which a liquid adhesive is applied to one surface of the base layer by a knife coating method, a nozzle coating method, a die coating method, a lip coating method, a comma coating method, a gravure coating method, a rotary screen coating method, a reverse roll coating method, or the like, the artificial leather is layered on a layer of the adhesive, and then the adhesive is cured to form the adhesive layer. Alternatively, when the adhesive layer is formed of a sheet-like adhesive material, a method in which the sheet-like adhesive material layer is placed on the base layer, and the artificial leather is further layered thereon can also be exemplified.

EXAMPLES

Next, the artificial leather of the present invention will be described more specifically with reference to Examples, but the present invention is not limited to these Examples. Next, an evaluation method used in Examples and measurement conditions thereof will be described. However, unless otherwise described, physical properties are measured based on the above methods. Details of the measurement method are described in embodiments of the invention.

[Measurement Method and Evaluation Method]
(1) Average Single Fiber Diameter of Fine Fibers (μm)

In the measurement of the average single fiber diameter of the fine fibers, the fine fibers were observed using "VHX-D500/D510" type manufactured by Keyence Corporation as a scanning electron microscope (SEM), and the average single fiber diameter was calculated.

(2) Tensile Strength of Fine Fiber (cN/Dtex)

The tensile strength of the fine fiber was measured and calculated by the above-described method using a Tensilon universal material tester "RTC-1350A" manufactured by A&D Company, Limited.

(3) Average Particle Diameter (μm) and Coefficient of Variation (CV) of Particle Diameter of Black Pigment Contained in Fine Fibers The ultrathin section in a cross-sectional direction of a plane perpendicular to the longitudinal direction of the fine fibers was prepared using an ultramicrotome "MT6000 type" manufactured by Sorvall. The obtained section was observed using a transmission electron microscope ("H7700 type" manufactured by Hitachi High-Tech Corporation). Next, the particle diameter of the pigment was measured using image analysis software ("WinROOF" manufactured by Mitani Corporation).

(4) Average Particle Diameter (μm) and Coefficient of Variation (CV) of Particle Diameter of Black Pigment Contained in Polymer Elastic Body The ultrathin section in a cross-sectional direction of a plane perpendicular to the longitudinal direction of a sheet material was prepared using an ultramicrotome "MT6000 type" manufactured by Sorvall. The obtained section was observed using "H7700 type" manufactured by Hitachi High-Tech Corporation as a transmission electron microscope. Next, the particle diameter of the pigment was measured using "WinROOF" manufactured by Mitani Corporation as image analysis software.

(5) Weight Per Unit Area of Artificial Leather or Composite Artificial Leather (g/m²)

Three test pieces each having a size of 30 cm×30 cm were collected in any direction of the artificial leather or composite artificial leather, and the mass per unit area (ISO method) specified in "6.2 Mass per unit area (ISO method)" in "Test methods for nonwovens" of JIS L1913: 2010 was each measured as the weight per unit area (g/m²) of the artificial leather. In the measurement, the arithmetic average of the measured values of the three test pieces was employed as the weight per unit area of the artificial leather.

(6) Number Per Unit Area (Number/Mm²) and Average Pore Diameter (μm) of Micropores Penetrating Artificial Leather in Thickness Direction and Having Pore Diameter of 35 μm or More and 500 μm or Less In the measurement of the number per unit area of micropores penetrating the artificial leather in the thickness direction and having a pore diameter of 35 μm or more and 500 μm or less and the measurement of the average pore diameter of the micropores, "VHX-5000" manufactured by Keyence Corporation was used as a microscope, and "ImageJ" was used as image analysis software. Note that the transmitted illumination of the digital microscope was set such that the output was 97 with respect to the output setting range 0 to 255. In addition, hereinafter, in the description including Tables 1 to 3, the "number per unit area of micropores penetrating the artificial leather in the thickness direction and having a pore diameter of 35 μm or more and 500 μm or less" and the "average pore diameter of micropores penetrating the artificial leather in the thickness direction" are abbreviated as the "number per unit area of micropores" and the "average pore diameter of micropores", respectively.

(7) Nap Coverage of Artificial Leather (%)

In the measurement of the nap coverage, "VHX-D500/D510" manufactured by Keyence Corporation was used as a scanning electron microscope (SEM), and "ImageJ" was used as image analysis software.

(8) Nap Length of Artificial Leather (μm)

"VHX-D500/D510", manufactured by Keyence Corporation was used as a scanning electron microscope (SEM) in the measurement of the nap length of the artificial leather.

(9) Lightness (L* Value) of Artificial Leather

The lightness of the surface is determined by measuring, as a measurement surface, a nap surface of the artificial leather in a state where the raised nap is laid with a lint brush or the like, and the lightness is represented by an L* value defined by a 3.3 CIE 1976 lightness index of JIS Z8781-4: 2013 Colorimetry-Part 4: CIE 1976 L*a*b* Colour space. The L* value was measured 10 times using a spectrophotometer: CM-M6 manufactured by Konica Minolta, Inc., and the arithmetic average of the measurement results was employed as the L* value of the artificial leather.

(10) Rubbing Fastness of Artificial Leather

The degree of contamination of the sample after the rubbing test was determined according to the gray scale for contamination specified in JIS L0805: 2005 "Grey scale for assessing staining", and a sample of grade 4 or higher (color difference ΔE*ab according to L*a*b* color system is 4.5±0.3 or less) was rated as acceptable.

(11) Light Fastness of Artificial Leather

The degree of discoloration of the sample after irradiation with xenon arc lamp light was graded using the gray scale for discoloration specified in JIS L0804: 2004 "Grey scale for assessing change in colour", and a sample of grade 4 or higher (color difference ΔE*ab according to L*a*b* color system is 1.7±0.3 or less) was rated as acceptable.

(12) Wear Resistance of Artificial Leather (Mg)

A wear resistance test was performed using "Model 406" manufactured by James H. Heal & Co. Ltd., as a wear tester and "Abrasive CLOTH SM25" manufactured by James H. Heal & Co. Ltd., as a standard rubbing cloth, and artificial leather in which the wear weight loss of the artificial leather was 10 mg or less was rated as acceptable.

(13) Tensile Strength of Artificial Leather (N/cm)

Two test pieces each having a size of 2 cm×20 cm were collected in any direction of the artificial leather, and the tensile strength (N/cm) specified in accordance with "6.3.1 Tensile strength and elongation percentage (ISO method)" in "Test methods for nonwovens" of JIS L1913: 2010 was measured. In the measurement, the average of the two test pieces was employed as the tensile strength of the artificial leather. In the measurement, a single column desktop tester "3343" manufactured by Instron was used.

(14) Surface Quality of Artificial Leather or Composite Artificial Leather

The surface quality of the artificial leather or the composite artificial leather was evaluated by a total of 20 evaluators consisting of 10 healthy adult men and 10 healthy adult women and after visually deciding the following ratings, the most common rating was employed as the surface quality of the artificial leather. In the case of a tie between ratings, a higher rating was employed as the surface quality of the artificial leather. Good acceptance levels of the present invention were A and B.

A: Very uniform surface quality
B: Uniform surface quality
C: Surface quality with large variation
D: Surface quality with very large variation

(15) Touch Sensation of Artificial Leather or Composite Artificial Leather

The touch sensation of the artificial leather or the composite artificial leather was evaluated by a total of 20 evaluators consisting of 10 healthy adult men and 10 healthy adult women and after visually deciding the following ratings, the most common rating was employed as the touch sensation of the artificial leather. In the case of a tie between ratings, a higher rating was employed as the touch sensation of the artificial leather. Good acceptance levels of the present invention were A and B.

A: Dense feeling and very smooth touch sensation
B: Dense feeling and smooth touch sensation
C: Poor dense feeling and rough touch sensation
D: Poor dense feeling and very rough touch sensation

(16) Total Amount of Heat Generated of Artificial Leather and Composite Artificial Leather (MJ/m$^2$)

The total amount of heat generated, as measured by a heat release test (radiant heat 50 kW/m$^2$, heating time 10 minutes) in accordance with ISO 5660-1:2015 was evaluated using "C4" manufactured by Toyo Seiki Seisaku-sho, Ltd. as a cone calorimeter tester.

Example 1

<Step of Producing Raw Stock>

Fine fiber-generating fibers having an islands-in-the-sea fiber structure composed of an island component and a sea component were melt-spun under the following conditions.

Island component: polyethylene terephthalate having an intrinsic viscosity (IV value) of 0.72
Sea component: polystyrene having an MFR (melt flow rate, measured by test method specified in ISO 1133: 1997, and the same applies hereinafter) of 65 g/10 min
Spinneret: spinneret for islands-in-the-sea fibers having 16 islands/hole
Spinning temperature: 285° C.
Mass ratio of island portion/sea portion: 57/43
Discharge rate: 1.2 g/(min·hole)
Spinning speed: 1,200 m/min.

Then, the islands-in-the-sea fibers were drawn 2.5 times in a steam box at 150° C. Then, the drawn fibers were crimped using a stuffer box crimper, followed by cutting to a length of 51 mm to provide raw stock of islands-in-the-sea fibers with a single fiber fineness of 4.2 dtex. The average single fiber diameter of the fine fibers obtained from the islands-in-the-sea fibers was 3.7 µm, and the strength of the fine fibers was 3.3 cN/dtex.

<Step of Producing Nonwoven Fabric or Fiber-Tangled Body Containing Nonwoven Fabric>

The raw stock obtained as described above was used to form a layered web via carding and cross wrapper steps. The needle punching treatment was performed with a number of punches of 2,500 punches/cm$^2$ to obtain a nonwoven fabric having a weight per unit area of 400 g/m$^2$ and a thickness of 2.2 mm.

<Step of Generating Fine Fibers>

The nonwoven fabric obtained as described above was shrunk with hot water at 96° C. Thereafter, the nonwoven fabric shrunk with hot water was impregnated with a polyvinyl alcohol (hereinafter, abbreviated as PVA) aqueous solution having a saponification degree of 88%, which was prepared so as to have a concentration of 12 mass %. Furthermore, the nonwoven fabric was squeezed with rollers and dried by hot air having a temperature of 120° C. for 10 minutes while allowing for migration of PVA, to obtain a PVA-impregnated sheet in which the mass of PVA was 43 mass % relative to the mass of a sheet base. A step of immersing the PVA-impregnated sheet thus obtained in trichloroethylene and squeezing and compressing the PVA-impregnated sheet by a mangle was performed 10 times. Thus, dissolution removal of the sea portion and compression treatment of the PVA-impregnated sheet were performed to obtain a PVA-impregnated sheet in which the fine fiber bundles to which PVA was applied were entangled.

<Step of Applying Polymer Elastic Body>

A DMF (dimethylformamide) solution of polyurethane prepared so that the concentration of a solid content mainly composed of polyurethane containing carbon black as black pigment (average primary particle diameter: 0.02 µm, coefficient of variation (CV) of particle diameter: 20%) was 12.0% was immersed in the PVA-impregnated sheet obtained as described above. Thereafter, the sea-removing PVA-impregnated sheet immersed in DMF solution of polyurethane was squeezed with rollers. Then, the sheet was immersed in a DMF aqueous solution having a concentration of 30 mass % to coagulate the polyurethane. After that, PVA and DMF were removed by hot water, and a silicone oil emulsion adjusted to a concentration of 1 mass % was impregnated into the sheet, thereby applying a silicone-based lubricant such that the applied amount thereof was 0.5 mass % relative to the total mass of the mass of the fiber-tangled body and the mass of the polyurethane, and drying was performed with hot air having a temperature of 110° C. for 10 minutes. As a result, a polyurethane-impregnated sheet having a thickness of 1.3 mm was obtained in which the mass of the polyurethane relative to the mass of the fiber-tangled body was 49 mass %, and the content of the carbon black contained in the polyurethane was 1.5 mass % relative to the total mass of the polyurethane and the carbon black. The average particle diameter (secondary particle diameter) of carbon black in the polyurethane was 0.1 μm, and the coefficient of variation (CV) of the particle diameter was 30%.

<First Widening Step>

The polyurethane-impregnated sheet obtained as described above was cut in half such that the thickness of each part was ½. Subsequently, the surface layer portion of the half-cut surface was buffed by 0.30 mm with an endless sandpaper having a sandpaper grit size of 100, 120, and 180 to perform napping, thereby obtaining a sheet having an average single fiber diameter of fine fibers of 3.7 μm, a weight per unit area of 92 g/m², a thickness of 0.33 mm, and a width of 112 cm. Furthermore, the sheet obtained by napping was widened to a width of 147 cm with a pin tenter.

<Second Widening Step>

Using a jet dyeing machine, the sheet was dyed with a black dye at 120° C. using a recipe in which the L* value of the dyed sheet was adjusted to 22, and then subjected to reduction cleaning, thereby obtaining a sheet having a width of 141 cm. Thereafter, the sheet was widened to a width of 148 cm with a pin tenter, and then dried at 100° C. for 7 minutes to obtain an artificial leather in which the average single fiber diameter of fine fibers constituting the artificial leather was 3.7 μm, the weight per unit area was 69 g/m², the thickness was 0.32 mm, the number per unit area of micropores was 1.0/mm², the average pore diameter of micropores was 50 μm, the nap coverage was 85%, and the nap length was 330 μm. The obtained artificial leather had very uniform surface quality, very dense feeling, smooth touch sensation, and excellent wear resistance while suppressing the total amount of heat generated at the time of combustion at a low weight per unit area. The results are shown in Table 1.

Example 2

An artificial leather was obtained in the same manner as in Example 1 except that in the <first widening step>, widening the sheet obtained by napping to a width of 147 cm with a pin tenter was changed to widening to a width of 150 cm, and in the <second widening step>, after the sheet was dyed and subjected to reduction cleaning to obtain a sheet having a width of 141 cm, widening the sheet to a width of 148 cm with a pin tenter was changed to widening to a width of 150 cm.

An artificial leather was obtained in which the average single fiber diameter of the fine fibers constituting the artificial leather was 3.7 μm, the weight per unit area was 57 g/m², the thickness was 0.28 mm, the number per unit area of micropores was 1.9/mm², the average pore diameter of micropores was 55 μm, the nap coverage was 85%, and the nap length was 330 μm. The obtained artificial leather had very uniform surface quality, very dense feeling, smooth touch sensation, and excellent wear resistance while suppressing the total amount of heat generated at the time of combustion at a low weight per unit area. The results are shown in Table 1.

Example 3

An artificial leather was obtained in the same manner as in Example 1 except that in the <first widening step>, widening the sheet obtained by napping to a width of 147 cm with a pin tenter was changed to widening to a width of 140 cm, and in the <second widening step>, an operation was changed such that the sheet was dyed and subjected to reduction cleaning to obtain a sheet having a width of 135 cm, and then the obtained sheet was widened to a width of 148 cm with a pin tenter.

An artificial leather was obtained in which the average single fiber diameter of the fine fibers constituting the artificial leather was 3.7 μm, the weight per unit area was 68 g/m², the thickness was 0.34 mm, the number per unit area of micropores was 4.0/mm², the average pore diameter of micropores was 62 μm, the nap coverage was 85%, and the nap length was 330 μm. The obtained artificial leather had uniform surface quality, dense feeling, smooth touch sensation, and excellent wear resistance while suppressing the total amount of heat generated at the time of combustion at a low weight per unit area. The results are shown in Table 1.

Example 4

An artificial leather was obtained in the same manner as in Example 1 except that in the <first widening step>, buffing the surface layer portion of the half-cut surface by 0.30 mm was changed to buffing the half-cut surface by 0.33 mm, and widening the sheet having a width of 108 cm obtained by napping to a width of 147 cm with a pin tenter was changed to widening to a width of 150 cm, and further in the <second widening step>, an operation was changed such that a sheet having a width of 140 cm was obtained, and then the obtained sheet was widened to a width of 150 cm with a pin tenter.

An artificial leather was obtained in which the average single fiber diameter of the fine fibers constituting the artificial leather was 3.7 μm, the weight per unit area was 52 g/m², the thickness was 0.25 mm, the number per unit area of micropores was 3.6/mm², the average pore diameter of micropores was 78 μm, the nap coverage was 80%, and the nap length was 300 μm. The obtained artificial leather had uniform surface quality, dense feeling, smooth touch sensation, and excellent wear resistance while suppressing the total amount of heat generated at the time of combustion at a low weight per unit area. The results are shown in Table 1.

Example 5

An artificial leather was obtained in the same manner as in Example 1 except that in the <step of producing raw stock>, the conditions for melt-spinning the fine fiber-generating fibers having an islands-in-the-sea fiber structure consisting of an island component and a sea component were changed to the following conditions, and further, drawing the islands-in-the-sea fibers to 2.5 times in a steam box at 150° C. was changed to drawing the fine fiber-generating fibers to 3.5 times in a spinning oil solution bath at 90° C.

Island component: polyethylene terephthalate having an intrinsic viscosity (IV value) of 0.73
Sea component: polystyrene having an MFR of 65 g/10 min
Spinneret: spinneret for islands-in-the-sea fibers having 36 islands/hole
Spinning temperature: 285° C.
Mass ratio of island portion/sea portion: 55/45
Discharge rate: 1.1 g/(min·hole)
Spinning speed: 1,100 m/min.

An artificial leather was obtained in which the average single fiber diameter of the fine fibers constituting the artificial leather was 2.1 μm, the weight per unit area was 73 g/m², the thickness was 0.36 mm, the number per unit area of micropores was 0.1/mm², the average pore diameter of micropores was 35 μm, the nap coverage was 85%, and the nap length was 330 μm. The obtained artificial leather had very uniform surface quality, very dense feeling, smooth touch sensation, and excellent wear resistance while suppressing the total amount of heat generated at the time of combustion at a low weight per unit area. The results are shown in Table 1.

Example 6

An artificial leather was obtained in the same manner as in Example 1 except that in the <step of producing raw stock>, the conditions for melt-spinning the fine fiber-generating fibers having an islands-in-the-sea fiber structure consisting of an island component and a sea component were changed to the following conditions, and further, drawing the islands-in-the-sea fibers to 2.5 times in a steam box at 150° C. was changed to drawing the fine fiber-generating fibers to 3.0 times in a spinning oil solution bath at 90° C.

Island component: polyethylene terephthalate having an intrinsic viscosity (IV value) of 0.72
Sea component: polystyrene having an MFR of 65 g/10 min
Spinneret: spinneret for islands-in-the-sea fibers having 16 islands/hole
Spinning temperature: 285° C.
Mass ratio of island portion/sea portion: 90/10
Discharge rate: 1.6 g/(min·hole)
Spinning speed: 1,100 m/min.

An artificial leather was obtained in which the average single fiber diameter of the fine fibers constituting the artificial leather was 5.5 μm, the weight per unit area was 63 g/m², the thickness was 0.30 mm, the number per unit area of micropores was 1.5/mm², the average pore diameter of micropores was 58 μm, the nap coverage was 85%, and the nap length was 330 μm. The obtained artificial leather had very uniform surface quality, very dense feeling, smooth touch sensation, and excellent wear resistance while suppressing the total amount of heat generated at the time of combustion at a low weight per unit area. The results are shown in Table 1.

Example 7

An artificial leather was obtained in the same manner as in Example 1 except that in the <step of applying polymer elastic body>, the amount of the silicone-based lubricant applied was changed from 0.5 mass % to 2.0 mass % relative to the total mass of the mass of the fiber-tangled body and the mass of the polyurethane.

An artificial leather was obtained in which the average single fiber diameter of the fine fibers constituting the artificial leather was 3.7 μm, the weight per unit area was 69 g/m², the thickness was 0.32 mm, the number per unit area of micropores was 0.6/mm², the average pore diameter of micropores was 45 μm, the nap coverage was 90%, and the nap length was 610 μm. The obtained artificial leather had slightly poor wear resistance, but had uniform surface quality, dense feeling, and smooth touch sensation while suppressing the total amount of heat generated at the time of combustion at a low weight per unit area. The results are shown in Table 2.

Example 8

An artificial leather was obtained in the same manner as in Example 1 except that in the <step of applying polymer elastic body>, the amount of the silicone-based lubricant applied was changed from 0.5 mass % to 0.1 mass % relative to the total mass of the mass of the fiber-tangled body and the mass of the polyurethane.

An artificial leather was obtained in which the average single fiber diameter of the fine fibers constituting the artificial leather was 3.7 μm, the weight per unit area was 69 g/m², the thickness was 0.32 mm, the number per unit area of micropores was 3.8/mm², the average pore diameter of micropores was 65 μm, the nap coverage was 70%, and the nap length was 190 μm. The obtained artificial leather had uniform surface quality, dense feeling, smooth touch sensation, and excellent wear resistance while suppressing the total amount of heat generated at the time of combustion at a low weight per unit area. The results are shown in Table 2.

Example 9

An artificial leather was obtained in the same manner as in Example 1 except that in the <step of producing raw stock>, the length of the islands-in-the-sea fibers after cutting was changed from 51 mm to 102 mm.

An artificial leather was obtained in which the average single fiber diameter of the fine fibers constituting the artificial leather was 3.7 μm, the weight per unit area was 68 g/m², the thickness was 0.32 mm, the number per unit area of micropores was 2.1/mm², the average pore diameter of micropores was 60 μm, the nap coverage was 82%, and the nap length was 280 μm. The obtained artificial leather had very uniform surface quality, dense feeling, smooth touch sensation, and excellent wear resistance while suppressing the total amount of heat generated at the time of combustion at a low weight per unit area. The results are shown in Table 2.

Example 10

An artificial leather was obtained in the same manner as in Example 1 except that in the <step of producing raw stock>, the length of the islands-in-the-sea fibers after cutting was changed from 51 mm to 17 mm.

An artificial leather was obtained in which the average single fiber diameter of the fine fibers constituting the artificial leather was 3.7 μm, the weight per unit area was 70 g/m², the thickness was 0.34 mm, the number per unit area of micropores was 0.8/mm², the average pore diameter of micropores was 53 μm, the nap coverage was 85%, and the nap length was 330 μm. The obtained artificial leather had slightly poor wear resistance, but had very uniform surface quality, dense feeling, and smooth touch sensation while suppressing the total amount of heat generated at the time of combustion at a low weight per unit area. The results are shown in Table 2.

Example 11

An artificial leather was obtained in the same manner as in Example 1 except that in the <step of producing raw stock>, the conditions for melt-spinning the fine fiber-generating fibers having an islands-in-the-sea fiber structure consisting of an island component and a sea component were changed to the following conditions.

Island component: a mixture of the following components P1 and P2 at a mass ratio of 95:5
P1 polyethylene terephthalate having an intrinsic viscosity (IV value) of 0.72
P2 a masterbatch containing 20 mass % of carbon black (average particle diameter: 0.02 μm, coefficient of variation (CV) of particle diameter: 20%) as a black pigment relative to the mass of the masterbatch in the polyethylene terephthalate A Sea component: polystyrene having an MFR (melt flow rate, measured by test method specified in ISO 1133: 1997) of 65 g/10 min
Spinneret: spinneret for islands-in-the-sea fibers having 16 islands/hole
Spinning temperature: 285° C.
Mass ratio of island portion/sea portion: 57/43
Discharge rate: 1.2 g/(min·hole)
Spinning speed: 1,200 m/min.

An artificial leather was obtained in which the average single fiber diameter of the fine fibers constituting the artificial leather was 3.7 μm, the average particle diameter of the carbon black in the fine fibers was 0.13 μm, the coefficient of variation (CV) of the particle diameter was 30%, the weight per unit area was 69 g/m², the thickness was 0.33 mm, the number per unit area of micropores was 0.9/mm², the average pore diameter of micropores was 51 μm, the nap coverage was 85%, and the nap length was 330 μm. The obtained artificial leather had very uniform surface quality, very deep color, uniform color developability, excellent touch sensation, and wear resistance while suppressing the total amount of heat generated at the time of combustion at a low weight per unit area. The results are shown in Table 2.

TABLE 1

| | | | Example 1 | Example 2 | Example 3 | Example 4 | Example 5 | Example 6 |
|---|---|---|---|---|---|---|---|---|
| Fine fibers | Component | | PET | PET | PET | PET | PET | PET |
| | Average single fiber diameter [μm] | | 3.7 | 3.7 | 3.7 | 3.7 | 2.1 | 5.5 |
| | Fiber length [mm] | | 51 | 51 | 51 | 51 | 51 | 51 |
| | Tensile strength [cN/dtex] | | 3.3 | 3.3 | 3.3 | 3.3 | 3.3 | 3.3 |
| | Presence or absence of black pigment | | Absent | Absent | Absent | Absent | Absent | Absent |
| Polymer elastic body | | Component | PU | PU | PU | PU | PU | PU |
| | | Content of polymer elastic body relative to mass of fiber-tangled body [mass %] | 49.0 | 49.0 | 49.0 | 49.0 | 49.0 | 49.0 |
| Artificial leather | First widening step | Weight per unit area before widening [g/m²] | 92 | 92 | 92 | 85 | 104 | 100 |
| | | Width before widening [cm] | 112 | 112 | 112 | 108 | 112 | 112 |
| | | Width after widening [cm] | 147 | 150 | 140 | 150 | 147 | 147 |
| | | Widening ratio [%] | 31.3 | 33.9 | 25.0 | 38.9 | 31.3 | 31.3 |
| | Second widening step | Width before widening [cm] | 141 | 141 | 135 | 140 | 141 | 141 |
| | | Width after widening [cm] | 148 | 150 | 148 | 150 | 148 | 148 |
| | | Widening ratio [%] | 5.0 | 6.4 | 9.6 | 7.1 | 5.0 | 5.0 |
| | | Weight per unit area after widening [g/m²] | 69 | 57 | 68 | 52 | 73 | 63 |
| | Weight per unit area of artificial leather [g/m²] | | 69 | 57 | 68 | 52 | 73 | 63 |
| | Number per unit area of micropores [number/mm²] | | 1.0 | 1.9 | 4.0 | 3.6 | 0.1 | 1.5 |
| | Average pore diameter of micropores [μm] | | 50 | 55 | 62 | 78 | 35 | 58 |
| | Nap length [μm] | | 330 | 330 | 330 | 300 | 330 | 330 |
| | Nap coverage on surface [%] | | 85 | 85 | 85 | 80 | 85 | 85 |
| | Total amount of heat generated [MJ/m²] | | 2.1 | 1.7 | 2.0 | 1.5 | 2.8 | 2.3 |
| | Wear resistance [mg] | | 8.0 | 9.2 | 9.6 | 9.8 | 9.8 | 5.6 |
| | Tensile strength [N/cm] | | 16 | 13 | 12 | 11 | 14 | 18 |
| | Lightness [—] | | 22 | 22 | 22 | 22 | 22 | 22 |
| | Rubbing fastness [grade] | | 4 | 4 | 3.5 | 4 | 3.5 | 4 |
| | Light fastness [grade] | | 3.5 | 3.5 | 3.5 | 3.5 | 3 | 4 |
| | Surface quality | | A | A | B | B | A | A |
| | Touch sensation | | A | A | B | B | A | A |

TABLE 2

| | | | Example 7 | Example 8 | Example 9 | Example 10 | Example 11 |
|---|---|---|---|---|---|---|---|
| Fine fibers | | Component | PET | PET | PET | PET | PET |
| | | Average single fiber diameter [μm] | 3.7 | 3.7 | 3.7 | 3.7 | 3.7 |
| | | Fiber length [mm] | 51 | 51 | 102 | 17 | 51 |
| | | Tensile strength [cN/dtex] | 3.3 | 3.3 | 3.3 | 3.3 | 3.0 |
| | | Presence or absence of black pigment | Absent | Absent | Absent | Absent | Present |
| Polymer elastic body | | Component | PU | PU | PU | PU | PU |
| | | Content of polymer elastic body relative to mass of fiber-tangled body [mass %] | 49.0 | 49.0 | 49.0 | 49.0 | 49.0 |
| Artificial leather | First widening step | Weight per unit area before widening [g/m2] | 92 | 92 | 92 | 92 | 92 |
| | | Width before widening [cm] | 112 | 112 | 112 | 112 | 112 |
| | | Width after widening [cm] | 147 | 147 | 147 | 147 | 147 |
| | | Widening ratio [%] | 31.3 | 31.3 | 31.3 | 31.3 | 31.3 |
| | Second widening step | Width before widening [cm] | 141 | 141 | 138 | 143 | 141 |
| | | Width after widening [cm] | 148 | 148 | 148 | 148 | 148 |
| | | Widening ratio [%] | 5.0 | 5.0 | 7.2 | 3.5 | 5.0 |
| | | Weight per unit area after widening [g/m$^2$] | 69 | 69 | 68 | 70 | 69 |
| | Weight per unit area of artificial leather [g/m$^2$] | | 69 | 69 | 68 | 70 | 69 |
| | Number per unit area of micropores [number/mm$^2$] | | 0.6 | 3.8 | 2.1 | 0.8 | 0.9 |
| | Average pore diameter of micropores [μm] | | 45 | 65 | 60 | 53 | 51 |
| | Nap length [μm] | | 610 | 190 | 280 | 330 | 330 |
| | Nap coverage on surface [%] | | 90 | 70 | 82 | 85 | 85 |
| | Total amount of heat generated [MJ/m$^2$] | | 2.1 | 2.1 | 2.1 | 2.0 | 2.1 |
| | Wear resistance [mg] | | 10.5 | 6.0 | 7.6 | 10.3 | 9.3 |
| | Tensile strength [N/cm] | | 16 | 16 | 18 | 15 | 12 |
| | Lightness [—] | | 22 | 22 | 22 | 22 | 22 |
| | Rubbing fastness [grade] | | 3.5 | 4 | 4 | 3.5 | 3.5 |
| | Light fastness [grade] | | 3.5 | 3.5 | 3.5 | 3.5 | 4.5 |
| | Surface quality | | B | B | A | A | A |
| | Touch sensation | | B | B | B | B | A |

Comparative Example 1

In the <first widening step>, widening the sheet obtained by napping to a width of 150 cm with a pin tenter was changed to widening to a width of 154 cm with a pin tenter, and in the <second widening step>, the sheet was not widened with a pin tenter. That is, an artificial leather was obtained in the same manner as in Example 4 except that only the <first widening step> was performed.

An artificial leather was obtained in which the average single fiber diameter of the fine fibers constituting the artificial leather was 3.7 μm, the weight per unit area was 63 g/m$^2$, the thickness was 0.31 mm, the number per unit area of micropores was 6.5/mm$^2$, the average pore diameter of micropores was 105 μm, the nap coverage was 70%, and the nap length was 270 μm. The obtained artificial leather exhibited a suppressed total amount of heat generated at the time of combustion at a low weight per unit area, but had surface quality with large variation, poor dense feeling, and rough touch sensation, and had a wear weight loss of more than 10 mg, which was slightly poor wear resistance. The results are shown in Table 3.

Comparative Example 2

An artificial leather was obtained in the same manner as in Example 1 except that in the <first widening step>, the sheet obtained by napping was not widened with a pin tenter, and in the <second widening step>, an operation was changed such that the sheet was dyed and subjected to reduction cleaning to obtain a sheet having a width of 110 cm, and then the obtained sheet was widened to a width of 148 cm with a pin tenter.

An artificial leather was obtained in which the average single fiber diameter of the fine fibers constituting the artificial leather was 3.7 μm, the weight per unit area was 65 g/m$^2$, the thickness was 0.33 mm, the number per unit area of micropores was 9.7/mm$^2$, the average pore diameter of micropores was 132 μm, the nap coverage was 45%, and the nap length was 330 μm. The obtained artificial leather exhibited a suppressed total amount of heat generated at the time of combustion at a low weight per unit area, but had surface quality with very large variation, poor dense feeling, and very rough touch sensation, and had a wear weight loss of more than 10 mg, which was poor wear resistance. The results are shown in Table 3.

Comparative Example 3

An artificial leather was obtained in the same manner as in Example 1 except that in the <first widening step>, widening the sheet obtained by napping to a width of 147 cm with a pin tenter was changed to widening to a width of 139 cm, and in the <second widening step>, an operation was changed such that the sheet was subjected to reduction cleaning to obtain a sheet having a width of 133 cm, and then the obtained sheet was widened to a width of 148 cm with a pin tenter.

An artificial leather was obtained in which the average single fiber diameter of the fine fibers constituting the artificial leather was 3.7 µm, the weight per unit area was 68 g/m², the thickness was 0.34 mm, the number per unit area of micropores was 6.8/mm², the average pore diameter of micropores was 90 µm, the nap coverage was 70%, and the nap length was 330 µm. The obtained artificial leather had dense feeling and smooth touch sensation while suppressing the total amount of heat generated at the time of combustion at a low weight per unit area, but had surface quality with large variation, and had a wear weight loss of more than 10 mg, which was slightly poor wear resistance. The results are shown in Table 3.

Comparative Example 4

An artificial leather was obtained in the same manner as in Example 4 except that in the <first widening step>, the sheet obtained by napping was not widened with a pin tenter, and in the <second widening step>, the sheet obtained by dyeing was not widened with a pin tenter.

An artificial leather was obtained in which the average single fiber diameter of the fine fibers constituting the artificial leather was 3.7 µm, the weight per unit area was 85 g/m², the thickness was 0.40 mm, the number per unit area of micropores was 0.05/mm², the average pore diameter of micropores was 25 µm, the nap coverage was 90%, and the nap length was 350 µm. The obtained artificial leather had very uniform surface quality, very dense feeling, smooth touch sensation, and excellent wear resistance, but had a large total amount of heat generated at the time of combustion. The results are shown in Table 3.

As shown in Tables 1 and 2, in the artificial leathers of Examples 1 to 11, the sheet obtained by buffing was widened by 25% or more and 40% or less before dyeing with respect to the width of the sheet, then dyed, and further widened by 3% or more and 10% or less with respect to the width of the sheet after dyeing, so that the number per unit area of micropores was 0.1/mm² or more and 5.0/mm² or less, and the artificial leather achieved very uniform surface quality, very dense feeling, smooth touch sensation, and wear resistance while suppressing the total amount of heat generated at the time of combustion at a low weight per unit area.

On the other hand, as shown in Comparative Example 1 in Table 3, in a case where the sheet obtained by buffing was excessively widened with respect to the width of the sheet and then dyed, the total amount of heat generated at the time of combustion was suppressed at a low weight per unit area, but variation in the surface quality was large, resulting in poor dense feeling and rough touch sensation. As shown in Comparative Example 2, in a case where the sheet obtained by buffing was dyed and then excessively widened with respect to the width of the sheet after dyeing, the variation in the surface quality was very large, resulting in poor dense feeling and very rough touch sensation. As in the artificial leather of Comparative Example 3, in a case where the sheet obtained by buffing was not sufficiently widened with respect to the width of the sheet before dyeing, and the sheet was dyed and further excessively widened with respect to the width of the sheet after dyeing, the artificial leather had dense feeling and smooth touch sensation while suppressing

TABLE 3

|  |  |  | Comparative Example 1 | Comparative Example 2 | Comparative Example 3 | Comparative Example 4 |
|---|---|---|---|---|---|---|
| Fine fibers | Component |  | PET | PET | PET | PET |
|  | Average single fiber diameter [µm] |  | 3.7 | 3.7 | 3.7 | 3.7 |
|  | Fiber length [mm] |  | 51 | 51 | 51 | 51 |
|  | Tensile strength [cN/dtex] |  | 3.3 | 3.3 | 3.3 | 3.3 |
|  | Presence or absence of black pigment |  | Absent | Absent | Absent | Absent |
| Polymer elastic body | Component |  | PU | PU | PU | PU |
|  | Content of polymer elastic body relative to mass of fiber-tangled body [mass %] |  | 49.0 | 49.0 | 49.0 | 49.0 |
| Artificial leather | First widening step | Weight per unit area before widening [g/m²] | 85 | 92 | 92 | 85 |
|  |  | Width before widening [cm] | 108 | 112 | 112 | 108 |
|  |  | Width after widening [cm] | 154 | — | 139 | — |
|  |  | Widening ratio [%] | 42.6 | — | 24.1 | — |
|  | Second widening step | Width before widening [cm] | — | 110 | 133 | — |
|  |  | Width after widening [cm] | — | 148 | 148 | — |
|  |  | Widening ratio [%] | — | 34.5 | 11.3 | — |
|  |  | Weight per unit area after widening [g/m²] | — | 65 | 68 | — |
|  | Weight per unit area of artificial leather [g/m²] |  | 63 | 65 | 68 | 85 |
|  | Number per unit area of micropores [number/mm²] |  | 6.5 | 9.7 | 6.8 | 0.04 |
|  | Average pore diameter of micropores [µm] |  | 105 | 132 | 90 | 25 |
|  | Nap length [µm] |  | 270 | 330 | 330 | 350 |
|  | Nap coverage on surface [%] |  | 70 | 45 | 70 | 90 |
|  | Total amount of heat generated [MJ/m²] |  | 1.9 | 2.0 | 2.0 | 3.2 |
|  | Wear resistance [mg] |  | 11.5 | 12.0 | 11.0 | 9.0 |
|  | Tensile strength [N/cm] |  | 8 | 5 | 6 | 18 |
|  | Lightness [—] |  | 22 | 22 | 22 | 22 |
|  | Rubbing fastness [grade] |  | 4 | 4 | 4 | 4 |
|  | Light fastness [grade] |  | 3.5 | 3.5 | 3.5 | 3.5 |
|  | Surface quality |  | C | D | C | A |
|  | Touch sensation |  | C | D | B | A | the total amount of heat generated at the time of combustion at a low weight per unit area, but the variation in the surface quality was large.

Furthermore, as in the artificial leather of Comparative Example 4, in a case where predetermined widening was not performed before and after dyeing, the artificial leather had very uniform surface quality, very dense feeling, smooth touch sensation, and excellent wear resistance, but the total amount of heat generated at the time of combustion was large, and thus fireproofness could not be achieved.

Examples 12 to 22 and Comparative Examples 5 to 8

Composite artificial leathers were obtained using the artificial leathers of Examples 1 to 11 and Comparative Examples 1 to 4. Paper (weight per unit area: 100 g/m$^2$) containing only natural pulp as a pulp component and no synthetic resin was used for the base layer, and an ethylene-vinyl acetate-based resin was used for the adhesive layer. An ethylene-vinyl acetate-based resin was applied to one surface of a base material by a lip coating method so that the weight per unit area after drying was 35 g/m$^2$, then, the surface to which the resin has been applied and a non-nap surface (non-buffing surface) of the artificial leather were bonded to each other and layered, and the resin was dried by heating at 100° C., thus obtaining a composite artificial leather. The results are shown in Tables 4 to 6.

TABLE 4

| | | Example 12 | Example 13 | Example 14 | Example 15 | Example 16 | Example 17 |
|---|---|---|---|---|---|---|---|
| Artificial leather used | | Example 1 | Example 2 | Example 3 | Example 4 | Example 5 | Example 6 |
| Composite artificial leather | Weight per unit area of composite artificial leather [g/m$^2$] | 204 | 192 | 203 | 187 | 208 | 198 |
| | Weight per unit area of artificial leather (after widening) [g/m$^2$] | 69 | 57 | 68 | 52 | 73 | 63 |
| | Weight per unit area of adhesive material [g/m$^2$] | 35 | 35 | 35 | 35 | 35 | 35 |
| | Weight per unit area of base material [g/m$^2$] | 100 | 100 | 100 | 100 | 100 | 100 |
| | Total amount of heat generated [MJ/m$^2$] | 6.1 | 5.8 | 5.9 | 5.3 | 8.0 | 7.2 |
| | Surface quality | A | A | B | B | A | A |
| | Touch sensation | A | A | B | B | A | A |

TABLE 5

| | | Example 18 | Example 19 | Example 20 | Example 21 | Example 22 |
|---|---|---|---|---|---|---|
| Artificial leather used | | Example 7 | Example 8 | Example 9 | Example 10 | Example 11 |
| Composite artificial leather | Weight per unit area of composite artificial leather [g/m$^2$] | 204 | 204 | 203 | 205 | 204 |
| | Weight per unit area of artificial leather (after widening) [g/m$^2$] | 69 | 69 | 68 | 70 | 69 |
| | Weight per unit area of adhesive material [g/m$^2$] | 35 | 35 | 35 | 35 | 35 |
| | Weight per unit area of base material [g/m$^2$] | 100 | 100 | 100 | 100 | 100 |
| | Total amount of heat generated [MJ/m$^2$] | 6.1 | 6.1 | 6.2 | 6.0 | 6.3 |
| | Surface quality | B | B | A | A | A |
| | Touch sensation | B | B | B | B | A |

TABLE 6

| | | Comparative Example 5 | Comparative Example 6 | Comparative Example 7 | Comparative Example 8 |
|---|---|---|---|---|---|
| | Artificial leather used | Comparative Example 1 | Comparative Example 2 | Comparative Example 3 | Comparative Example 4 |
| Composite artificial leather | Weight per unit area of composite artificial leather [g/m$^2$] | 198 | 200 | 203 | 220 |
| | Weight per unit area of artificial leather (after widening) [g/m$^2$] | 63 | 65 | 68 | 85 |

TABLE 6-continued

| Artificial leather used | Comparative Example 5 Comparative Example 1 | Comparative Example 6 Comparative Example 2 | Comparative Example 7 Comparative Example 3 | Comparative Example 8 Comparative Example 4 |
|---|---|---|---|---|
| Weight per unit area of adhesive material [g/m$^2$] | 35 | 35 | 35 | 35 |
| Weight per unit area of base material [g/m$^2$] | 100 | 100 | 100 | 100 |
| Total amount of heat generated [MJ/m$^2$] | 6.0 | 6.1 | 6.0 | 8.4 |
| Surface quality | C | D | C | A |
| Touch sensation | C | D | B | A |

The composite artificial leathers of Examples 12 to 22 had uniform surface quality, dense feeling, and smooth touch sensation while suppressing the total amount of heat generated at the time of combustion. In particular, the composite artificial leathers of Examples 12, 13, 16, 17, and 22 had very uniform surface quality, very dense feeling, and smooth touch sensation while suppressing the total amount of heat generated at the time of combustion.

On the other hand, the composite artificial leathers of Comparative Examples 5 to 7 had surface quality with large variation because the artificial leathers of Comparative Examples 1 to 3 had surface quality with large variation. In particular, the composite artificial leathers of Comparative Examples 5 and 6 exhibited poor dense feeling and rough touch sensation because the artificial leathers of Comparative Examples 1 and 2 had poor dense feeling and rough touch sensation. The composite artificial leather of Comparative Example 8 exhibited a large total amount of heat generated at the time of combustion because the artificial leather of Comparative Example 4 had a large weight per unit area and a large total amount of heat generated at the time of combustion.

DESCRIPTION OF REFERENCE SIGNS

1: Artificial leather
2: Adhesive layer
3: Base layer

The invention claimed is:

1. An artificial leather comprising:
a fiber-tangled body containing a nonwoven fabric made of fine fibers having an average single fiber diameter of 0.01 µm or more and 10.0 µm or less; and
a polymer elastic body, wherein the artificial leather satisfies the following requirements:
requirement 1: the artificial leather has a weight per unit area of 25 g/m$^2$ or more and 75 g/m$^2$ or less; and
requirement 2: a number per unit area of micropores penetrating the artificial leather in a thickness direction and having a pore diameter of 35 µm or more and 500 µm or less is 0.1/mm$^2$ or more and 5.0/mm$^2$ or less.

2. The artificial leather according to claim 1, wherein micropores penetrating the artificial leather in the thickness direction have an average pore diameter of 35 µm or more and 100 µm or less.

3. The artificial leather according to claim 1, wherein the artificial leather has a nap length of 200 µm or more and 600 µm or less.

4. The artificial leather according to claim 1, wherein the fine fibers have a fiber length of 25 mm or more and 95 mm or less.

5. The artificial leather according to claim 1, wherein
the fine fibers include a polyester-based resin containing a black pigment, and
the black pigment has an average particle diameter of 0.05 µm or more and 0.20 µm or less.

6. A method for producing an artificial leather, comprising:
forming a sheet including a fiber-tangled body containing a nonwoven fabric made of fine fibers having an average single fiber diameter of 0.01 µm or more and 10.0 µm or less, and a polymer elastic body;
performing a first widening step of buffing the sheet and widening the sheet by 25% or more and 40% or less with respect to a width of the sheet obtained; and
performing a second widening step of dyeing the sheet after the first widening step, and widening the sheet by 3% or more and 10% or less with respect to a width of the sheet obtained.

7. The method for producing an artificial leather according to claim 6, wherein in the buffing of the sheet, only one of surfaces of the sheet is buffed.

8. The method for producing an artificial leather according to claim 6, wherein in the first widening step, the sheet after buffing and before widening has a weight per unit area of 80 g/m$^2$ or more and 110 g/m$^2$ or less.

9. A composite artificial leather comprising:
the artificial leather according to claim 1; and
a base layer provided on one surface of the artificial leather with an adhesive layer interposed between the artificial leather and the base layer,
wherein a main component of a resin composition of the adhesive layer is at least one selected from the group consisting of a vinyl acetate-based resin, an ethylene-vinyl acetate copolymer-based resin, a polypropylene-based resin, a polyethylene-based resin, an acrylic resin, and a vinyl chloride-based resin.

* * * * *